US009563393B2

(12) United States Patent
Zhang et al.

(10) Patent No.: US 9,563,393 B2
(45) Date of Patent: Feb. 7, 2017

(54) INFORMATION PROCESSING METHOD AND ELECTRONIC DEVICE

(71) Applicant: Lenovo (Beijing) Co., Ltd., Beijing (CN)

(72) Inventors: Weiwei Zhang, Beijing (CN); Ge Gao, Beijing (CN); Jie Xia, Beijing (CN); Xu Zhao, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/494,845

(22) Filed: Sep. 24, 2014

(65) Prior Publication Data

US 2015/0160907 A1 Jun. 11, 2015

(30) Foreign Application Priority Data

Dec. 11, 2013 (CN) .......................... 2013 1 0676728
Dec. 11, 2013 (CN) .......................... 2013 1 0676927

(51) Int. Cl.
*G06F 3/14* (2006.01)
*G09G 5/00* (2006.01)
*G06F 3/0488* (2013.01)
*G06F 3/041* (2006.01)
*G06F 3/0481* (2013.01)

(52) U.S. Cl.
CPC .......... *G06F 3/1407* (2013.01); *G06F 3/0416* (2013.01); *G06F 3/04817* (2013.01); *G06F 3/1423* (2013.01); *G09G 5/006* (2013.01); *G06F 3/0488* (2013.01); *G09G 2360/04* (2013.01)

(58) Field of Classification Search
USPC ......................................................... 345/3.1
See application file for complete search history.

(56) References Cited

U.S. PATENT DOCUMENTS

| 2010/0137026 A1* | 6/2010 | Kim ..................... H04N 9/3173 455/556.1 |
| 2012/0017147 A1* | 1/2012 | Mark ..................... G06F 1/1639 715/702 |
| 2012/0038672 A1* | 2/2012 | Im ......................... G06F 3/1423 345/636 |
| 2014/0002337 A1* | 1/2014 | Bandringa ........... G02B 27/646 345/156 |

* cited by examiner

*Primary Examiner* — Jennifer Mehmood
*Assistant Examiner* — Deeprose Subedi
(74) *Attorney, Agent, or Firm* — Harness, Dickey & Pierce, P.L.C.

(57) ABSTRACT

An information processing method is provided, which is applied to an electronic device. The electronic device includes a main body, a display unit and a projection unit. The method includes: obtaining trigger information for instructing the electronic device to switch from a first state to a second state; controlling the electronic device to switch from the first state to the second state in response to the trigger information; obtaining at least one parameter information; determining whether to enable the projection unit based on the at least one parameter information; and controlling the projection unit to be in the enabled state, in a case that it is determined to enable the projection unit based on the at least one parameter information.

26 Claims, 8 Drawing Sheets

INFORMATION PROCESSING METHOD AND ELECTRONIC DEVICE

This application claims priority of Chinese Patent Application No. 201310676728.1, entitled "INFORMATION PROCESSING METHOD AND ELECTRONIC DEVICE", filed with the Chinese State Intellectual Property Office on Dec. 11, 2013, and Chinese Patent Application No. 201310676927.2, entitled "INFORMATION PROCESSING METHOD AND ELECTRONIC DEVICE", filed with the Chinese State Intellectual Property Office on Dec. 11, 2013, both of which are incorporated by reference in their entireties herein.

TECHNICAL FIELD

The present application relates to the technical field of information, and in particular to an information processing method and an electronic device.

BACKGROUND

With the development of electronic technology, more and more electronic devices are adopted in people's life, which facilitate people's life and work. For example, a mobile phone facilitates a communication between people anywhere and anytime.

In view that pico-projection technology has been developed for many years and is relatively stable and mature, many of the electronic devices have a projection function now in order to meet the use requirement of a user. For example, the electronic device, such as a mobile phone or a tablet computer, is provided with the projection function.

In existing technologies, by taking a projection phone as an example, when using the projection function, the user can enable a projection unit only by clicking on a projection button. Thus, the method for enabling the projection unit is single. Although the projection function can be enabled normally, the requirement of the user on other ways to enable the projection unit can not be met. Thus, the electronic device in the existing technologies has some technical problems, for example, that the projection unit can not be enabled flexibly enough and the user experience is poor.

SUMMARY

An information processing method and an electronic device are provided according to embodiments of the application, for solving the technical problem of the electronic device in the existing technologies that the projection unit can not be enabled flexibly enough. Thus, the projection unit can be enabled flexibly, and the user experience is improved.

In one aspect, an information processing method is provided according to an embodiment of the application, which is applied to an electronic device including a main body, a display unit and a projection unit, where a first display interface corresponding to a content to be projected is formed on a projection region of the projection unit, and a second display interface is displayed on the display unit. The method includes:

obtaining trigger information for instructing the electronic device to switch from a first state to a second state, where the first state is a low power state of the electronic device, and the second state is a normal operation state of the electronic device;

controlling the electronic device to switch from the first state to the second state in response to the trigger information, where in a case that the electronic device is in the first state, the display unit is in a disabled state and the projection unit is in the disabled state; and in a case that the electronic device is in the second state, at least the display unit is in an enabled state;

obtaining at least one parameter information;

determining whether to enable the projection unit, based on the at least one parameter information; and controlling the projection unit to be in the enabled state, in a case that it is determined to enable the projection unit based on the at least one parameter information.

Optionally, before the obtaining at least one parameter information, the method further includes:

obtaining a first operation for a predetermined icon on the second display interface.

Optionally, in a case that the predetermined icon is a projection function switch icon, the at least one parameter information includes: a first switch signal for enabling the projection unit in response to the first operation for the projection function switch icon.

Optionally, in a case that the predetermined icon is an application icon corresponding to an application, the at least one parameter information includes: a second switch signal for enabling the application in response to the first operation for the application icon;

where when the application is run, an application display interface corresponding to the application is divided into a plurality of display contents and the plurality of display contents is displayed in different display screens.

Optionally, in a case that the predetermined icon is an application icon corresponding to a voice communication or a text communication, the at least one parameter information is a preset communication content for enabling the projection unit in a content of the voice communication or the text communication.

Optionally, in a case that the predetermined icon is an application icon corresponding to a common application, a prompt information is displayed on the second display interface, and the prompt information includes a first option for enabling the projection unit and a second option for disabling the projection unit, the obtaining at least one parameter information includes: obtaining a second operation for the first option;

where when the common application is run, an application display interface corresponding to the common application is not divided into a plurality of display contents, and is integrally displayed in a display screen.

Optionally, after the controlling the projection unit to be in the enabled state, in a case that it is determined to enable the projection unit based on the at least one parameter information, the method further includes:

displaying a first display content on the first display interface and generating a first prompt information, and where in a case that it is not determined to enable the projection unit based on the at least one parameter information, the method further includes:

displaying the first display content on the second display interface and generating the first prompt information.

Optionally, after the controlling the projection unit to be in the enabled state, the method further includes:

detecting a first touch operation for the first display interface, during a communication between the electronic device and a second electronic device;

judging whether the first touch operation touches a first application icon on the first display interface, to obtain a first judgment result;

running a first application corresponding to the first application icon, in a case that the first judgment result indicates that the first touch operation touches the first application icon;

judging whether the first touch operation touches a second region on the first display interface, to obtain a second judgment result, in a case that the first judgment result indicates that the first touch operation does not touch the first application icon; and displaying a second display content received from the second electronic device, in a case that the second judgment result indicates that the first touch operation touches the second region.

Optionally, after the judging whether the first touch operation touches a second region on the first display interface, to obtain a second judgment result, the method further includes:

judging whether the first touch operation touch a third region of the first display interface except the first application icon and the second region, to obtain a third judgment result; or judging whether a first touch trajectory of the first touch operation is a preset trajectory, to obtain a third judgment result; and displaying a communication content between the electronic device and the second electronic device, in a case that the third judgment result indicates that the first touch operation touches the third region of the first display interface except the first application icon and the second region; or that the first touch trajectory of the first touch operation is the preset trajectory.

Optionally, the first operation is an input operation for the predetermined icon, and the at least one parameter information is parameter information of an application corresponding to the predetermined icon.

Optionally, before the determining whether to enable the projection unit based on the at least one parameter information, the method further includes:

obtaining state information of the projection unit, and where the determining whether to enable the projection unit based on the at least one parameter information includes:

determining whether to enable the projection unit, based on the at least one parameter information and the state information of the projection unit.

Optionally, after the controlling the projection unit to be in the enabled state, the method further includes:

controlling the projection unit to display at least a first part of a graphic display interface corresponding to the application by calling a driving sub-unit of the projection unit, when the application is run.

Optionally, the method further including:

controlling the display unit to display at least a second part of the graphic display interface corresponding to the application, by calling the driving sub-unit of the projection unit, and where the obtaining at least one parameter information includes:

obtaining first parameter information for indicating that a type of the application is a first application type, in a case that the type of the application is the first application type, where the graphic display interface corresponding to the application includes a display content of the display unit and a display content of the projection unit; or obtaining second parameter information for indicating that a type of the application is a second application type, in a case that the type of the application is the second application type, where the graphic display interface corresponding to the application includes a display content of the display unit or a display content of the projection unit, and the display content of the display unit is the same as the display content of the projection unit.

Optionally, the obtaining state information of the projection unit includes:

obtaining state information for indicating that the projection unit is in a normal operation state, or obtaining state information for indicating that the projection unit is in a low power state.

Optionally, in the case that the type of the application is the first application type, the controlling the projection unit to display at least a first part of a graphic display interface corresponding to the application by calling a driving sub-unit of the projection unit, when the application is run includes:

in the case that the projection unit is in the normal operation state, controlling the projection unit to display at least the first part of the graphic display interface corresponding to the application by calling the driving sub-unit of the projection unit, when the application is run; or in the case that the projection unit is in the low power state, controlling the projection unit to switch from the low power state to the enabled state by calling the driving sub-unit of the projection unit, when the application is run; and controlling the projection unit to display at least the first part of the graphic display interface corresponding to the application, and in the case that the type of the application is the second application type, the controlling the projection unit to display at least a first part of a graphic display interface corresponding to the application by calling the driving sub-unit of the projection unit, when the application is run includes:

controlling the electronic device to output determination information for determining a display mode of the application; and controlling the projection unit to display at least the first part of the graphic display interface corresponding to the application by calling the driving sub-unit of the projection unit, based on the display mode, when the application is run.

Optionally, in the case that the projection unit is in the low power state, the controlling the electronic device to output determination information includes:

controlling the electronic device to output prompt information for prompting whether to enable the projection unit; and obtaining prompt determining operation information for indicating to enable the projection unit, in response to the prompt information; and controlling the electronic device to output the determination information.

Optionally, the controlling the projection unit to display at least the first part of the graphic display interface corresponding to the application by calling the driving sub-unit of the projection unit, based on the display mode, when the application is run includes:

controlling the projection unit to integrally display the graphic display interface corresponding to the application by calling the driving sub-unit of the projection unit, when the application is run, in the case that it is determined that the display mode of the application is a first display mode; or controlling the projection unit to display the first part of the graphic display interface corresponding to the application by calling the driving sub-unit of the projection unit, when the application is run, in the case that it is determined that the display mode of the application is a second display mode.

Optionally, the method further including:

controlling the display unit to integrally display the graphic display interface corresponding to the application, in the case that it is determined that the display mode of the application is the first display mode; or controlling the display unit to display the second part of the graphic display interface corresponding to the application, in the case that it is determined that the display mode of the application is the second display mode.

In another aspect, an electronic device is provided according to an embodiment of the application, which includes a main body, a display unit and a projection unit, where a first display interface corresponding to a content to be projected is formed on a projection region of the projection unit, and a second display interface is displayed on the display unit. The electronic device further includes:

a first obtaining unit configured to obtain trigger information for instructing the electronic device to switch from a first state to a second state, where the first state is a low power state of the electronic device, and the second state is a normal operation state of the electronic device;

a first responding unit configured to control the electronic device to switch from the first state to the second state in response to the trigger information, where in a case that the electronic device is in the first state, the display unit is in a disabled state, and the projection unit is in the disabled state; and when the electronic device is in the second state, at least the display unit is in an enabled state;

a second obtaining unit configured to obtain at least one parameter information;

a first determining unit configured to determine whether to enable the projection unit, based on the at least one parameter information; and a first control unit configured to control the projection unit to be in the enabled state, in a case that it is determined to enable the projection unit based on the at least one parameter information.

Optionally, the electronic device further includes:

a third obtaining unit configured to obtain a first operation for a predetermined icon on the second display interface.

Optionally, in a case that the predetermined icon is a projection function switch icon, the at least one parameter information includes: a first switch signal for enabling the projection unit in response to the first operation for the projection function switch icon.

Optionally, in a case that the predetermined icon is an application icon corresponding to an application, the at least one parameter information includes: a second switch signal for enabling the application in response to the first operation on the application icon;

where when the application is run, an application display interface corresponding to the application is divided into a plurality of display contents, and the plurality of display contents are displayed in different display screens.

Optionally, in a case that the predetermined icon is an application icon corresponding to a voice communication or a text communication, the at least one parameter information is a preset communication content for enabling the projection unit in a content of the voice communication or the text communication.

Optionally, in a case that the predetermined icon is an application icon corresponding to a common application, and a prompt information is displayed on the second display interface, and the prompt information includes a first option for enabling the projection unit and a second option for disabling the projection unit;

the at least one parameter information includes a second operation for the first option; and where when the common application is run, an application display interface corresponding to the common application is not divided into a plurality of display contents, and is integrally displayed in a display screen.

Optionally, the electronic device further includes:

a first display unit configured to display a first display content on the first display interface and generate a first prompt information, and a second display unit configured to display the first display content on the second display interface and generate the first prompt information.

Optionally, the electronic device further includes:

a first detecting unit configured to detect a first touch operation for the first display interface, during a communication between the electronic device and a second electronic device;

a first judging unit configured to judge whether the first touch operation touches a first application icon on the first display interface, to obtain a first judgment result;

a second responding unit configured to run a first application corresponding to the first application icon, in a case that the first judgment result indicates that the first touch operation touches the first application icon;

a second judging unit configured to judge whether the first touch operation touches a second region on the first display interface, to obtain a second judgment result, in a case that the first judgment result indicates that the first touch operation does not touch the first application icon; and a third display unit configured to display a second display content received from the second electronic device, in a case that the second judgment result indicates that the first touch operation touches the second region.

Optionally, the electronic device includes:

a third judging unit configured to judge whether the first touch operation touch a third region of the first display interface except the first application icon and the second region, to obtain a third judgment result; or judge whether a first touch trajectory of the first touch operation is a preset trajectory, to obtain a third judgment result; and a fourth display unit configured to display a communication content between the electronic device and the second electronic device, in a case that the third judgment result indicates that the first touch operation touch the third region of the first display interface except the first application icon and the second region; or that the first touch trajectory of the first touch operation is the preset trajectory.

Optionally, the first operation is an input operation for the predetermined icon, and the at least one parameter information is parameter information of an application corresponding to the predetermined icon.

Optionally, the electronic device further includes:

a fourth obtaining unit configured to obtain state information of the projection unit, where the first determining unit is further configured to determine whether to enable the projection unit, based on the at least one parameter information and the state information of the projection unit.

Optionally, the electronic device further includes:

a calling unit configured to control the projection unit to display at least a first part of a graphic display interface corresponding to the application by calling a driving sub-unit of the projection unit, when the application is run.

Optionally, the calling unit is further configured to control the display unit to display at least a second part of the graphic display interface corresponding to the application, by calling a driving sub-unit of the projection unit, and the second obtaining unit is configured to:

obtain first parameter information for indicating that a type of the application is a first application type, in a case that the type of the application is the first application type, where the graphic display interface corresponding to the application includes a display content of the display unit and a display content of the projection unit; or obtain second parameter information for indicating that a type of the application is a second application type, in a case that a type of the application is a second application type, where the graphic display interface corresponding to the application includes a display content of the display unit or a display content of the projection unit, and the display content of the display unit is the same as the display content of the projection unit.

Optionally, the fourth obtaining unit is further configured to:

obtain state information for indicating that the projection unit is in a normal operation state, or obtain state information for indicating that the projection unit is in a low power state.

Optionally, in the case that the type of the application is the first application type, the calling unit is further configured to:

in the case that the projection unit is in the normal operation state, control the projection unit to display at least the first part of the graphic display interface corresponding to the application by calling the driving sub-unit of the projection unit, when the application is run; or in the case that the projection unit is in the low power state, control the projection unit to switch from the low power state to the enabled state by calling the driving sub-unit of the projection unit, when the application is run; and control the projection unit to display at least the first part of the graphic display interface corresponding to the application, and in the case that the type of the application is the second application type, the calling unit is further configured to control the electronic device to output determination information for determining a display mode of the application; and control the projection unit to display at least the first part of the graphic display interface corresponding to the application by calling the driving sub-unit of the projection unit, based on the display mode, when the application is run.

Optionally, in the case that the type of the application is the second application type, the calling unit is further configured to:

when the projection unit is in the low power state, control the electronic device to output a prompt information for prompting whether to enable the projection unit; and obtain prompt determining operation information for indicating to enable the projection unit, in response to the prompt information; and control the electronic device to output the determination information.

Optionally, the calling unit is further configured to:

control the projection unit to integrally display the graphic display interface corresponding to the application by calling the driving sub-unit of the projection unit, when the application is run, in the case that it is determined that the display mode of the application is a first display mode; or control the projection unit to display the first part of the graphic display interface corresponding to the application by calling the driving sub-unit of the projection unit, when the application is run, in the case that it is determined that the display mode of the application is a second display mode.

Optionally, the calling unit is further configured to:

control the display unit to display integrally the graphic display interface corresponding to the application, in the case that it is determined that the display mode of the application is the first display mode; or control the display unit to display the second part of the graphic display interface corresponding to the application, in the case that it is determined that the display mode of the application is the second display mode.

One or more technical solutions provided in the embodiment of the application have at least the following technical effects or advantages.

1. When at least the display unit of the electronic device is in the enabled state, at least one parameter information for determining whether to enable the projection unit of the electronic device is obtained. In the case that it is determined to enable the projection unit based on the at least one parameter information, the projection unit is controlled to be in the enabled state, where the parameter information can indicate whether to enable the projection unit of the electronic device when the electronic device is in different use cases. In this way, it is solved the technical problem of the electronic device in the existing technology that the projection unit can not be enabled flexibly enough. Thus, the projection unit can be enabled flexibly, and the user experience is improved.

2. When the display unit of the electronic device is in the enabled state, the operations for different predetermined icons on the display interface correspond to different parameter information for enabling the projection unit. Thus, the projection unit can be enabled in many operation ways.

3. By directly obtaining the at least one parameter information for enabling the projection unit, the projection unit can still be enabled in different ways even if the electronic device has no display unit or the display unit of the electronic device is in the disabled state. Thus, the projection unit can be enabled flexibly and the user experience is improved.

4. When the projection unit is in the enabled state, the first display content is displayed on the projection display interface; and when the projection unit is in the disabled state, the first display content is displayed on the display interface of the electronic device. In this way, the first display content can be displayed on different display interfaces based on the enabling condition of the projection unit. Thus, the user can still view the first display content when the projection unit is enabled and a new way for displaying information content is provided.

5. During a communication between the electronic device and the second electronic device, the projection display interface is divided into the first region, the second region and the third region. Different communication contents are displayed when the touch operations performs on the first region, the second region and the third region respectively. Therefore, a new way for interacting and checking the communication content is provided in the communication process.

6. The electronic device may obtain the parameter information of the application and the state information of the projection unit, so as to monitor the application and the display unit. The display portion of the graphic display interface of the application in the projection unit may be controlled by calling the driving sub-unit of the projection unit. Thus, the electronic device can control the display/projection of the graphic display interface of the application in the projection unit by using the operation system. When the electronic device obtains different parameter information and/or different state information, the driving sub-unit may control different display modes of the graphic display interface of the application in the projection unit. Therefore, the disadvantage of the relatively single display/projection way of the application in the electronic device is overcome, the flexibility of the display of the electronic device is improved, and the display effect of the electronic device is enhanced.

DETAILED DESCRIPTION OF THE EMBODIMENTS

In embodiments of the present application, when at least a display unit of an electronic device is in an enabled state, at least one parameter information for determining whether to enable a projection unit of the electronic device is obtained; when it is determined that the projection unit is enabled according to the at least one parameter information, the projection unit is controlled to be in the enabled state. The parameter information may indicate whether the electronic device enables the projection unit thereof in different usage cases. Therefore, it is effectively solved the technical issue in the existing electronic device that the projection unit is enabled not flexibly enough. Thus, the projection unit can be enabled flexibly and user experience can be improved.

In the embodiments of the present application, it is employed a technical mean that at least one parameter information, which is used to enable the projection unit, is acquired directly. Therefore, the projection unit may be enabled in multiple ways even if the electronic device has not the display unit or the display unit of the electronic device is in a disabled state. Thus, the projection unit is enabled flexibly and the user experience is improved.

In the following, the above technical schemes are described in detail in conjunction with the drawings and embodiments, to understand the above technical scheme better.

First Embodiment

Figure 14:
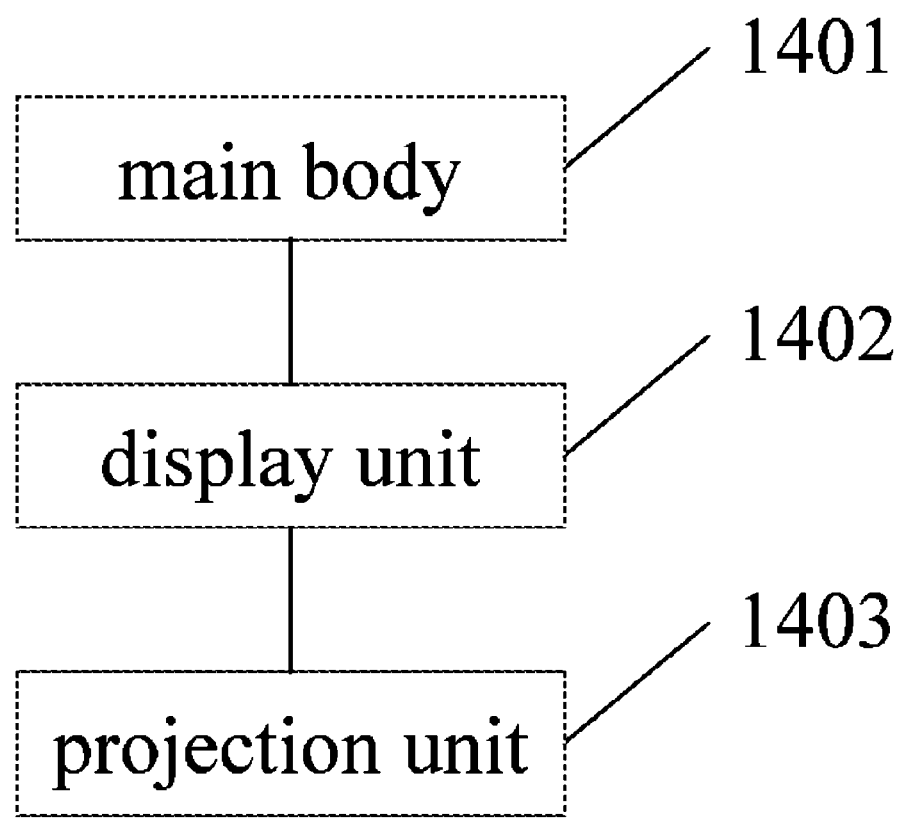
FIG. 14 is a functional block diagram of an electronic device according to an embodiment of the application.

An information processing method according to the embodiment of the present application is applied to an electronic device. As shown in FIG. 14, the electronic device 1400 includes a main body 1401, a display unit 1402 and a projection unit 1403. Specifically, the display unit 1402 is arranged on a first surface of the main body, which has a first edge and a second edge facing the first edge. The first edge is parallel to the second edge. The projection unit 1403 is arranged in the main body 1401, which is configured to project a content to be projected on a projection region. In the case that the projection region is arranged on a first carrying surface of a carrying body, a first display interface corresponding to the content to be projected is formed. The first display interface is located on a first side corresponding to the first edge of the display unit 1402. The display unit 1402 is capable of displaying a second display interface. A predetermined angle is provided between the first and second display interfaces.

In the embodiment of the present application, the first display interface is a projection display interface projected by the projection unit, and the second display interface is a display interface displayed by the display unit of the electronic device.

In an implementation, the electronic device may be a smart phone with a projection function, a laptop with the projection function or a tablet PC with the projection function. Actually, any electronic device with the main body, the display unit and the projection unit may realize the information processing method according to the embodiment of the present application, which will not be limited herein. The information processing method according to the embodiment of the present application is described only by taking the smart phone with the projection function as an example.

Figure 1:
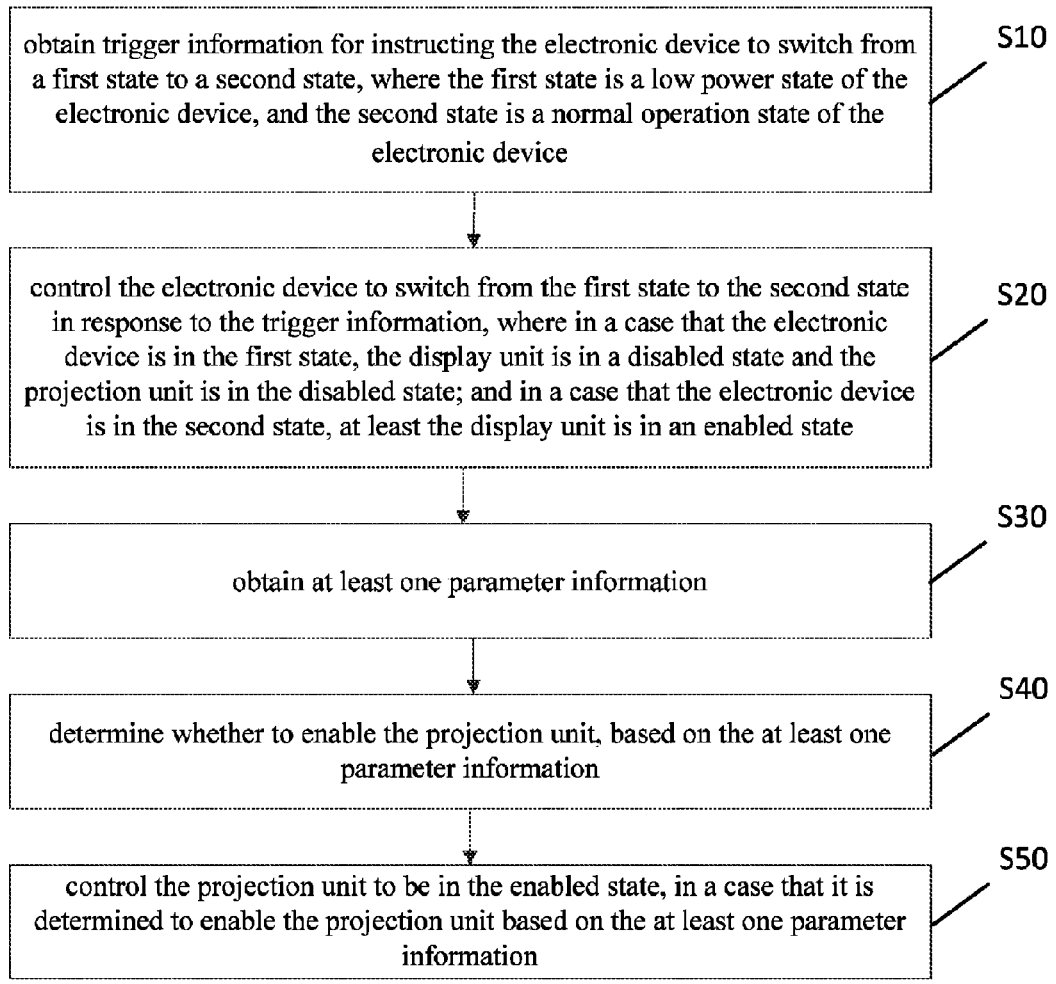
FIG. 1 is a flow chart of an information processing method according to a first embodiment of the application.

As shown in FIG. 1, an information processing method according to the embodiment of the present application includes: steps S10-S50.

The step S10 may include: obtaining trigger information for instructing the electronic device to switch from a first state to a second state, where the first state is a low power state of the electronic device, and the second state is a normal operation state of the electronic device.

The step S20 may include: controlling the electronic device to switch from the first state to the second state in response to the trigger information, where in a case that the electronic device is in the first state, the display unit is in a disabled state and the projection unit is in the disabled state; and in a case that the electronic device is in the second state, at least the display unit is in an enabled state.

The step S30 may include: obtaining at least one parameter information.

The step S40 may include: determining whether to enable the projection unit, based on the at least one parameter information.

The step S50 may include: controlling the projection unit to be in the enabled state, in a case that it is determined to enable the projection unit based on the at least one parameter information.

In the following, implementations of the steps S10 and S20 will be described in detail by taking a case that the electronic device is the smart phone with the projection function as an example.

In the embodiment of the present application, the smart phone has first and second states. The first state is a low power state. In this case, both the display unit and the projection unit of the smart phone are in the disabled state. For example, the smart phone is in a shutdown state, a lock screen state, a screen backlight turn-off state, or the like. The second state is a normal operation state. For example, the display unit of the smart phone is in the enabled state, or both the display unit and the projection unit of the smart phone are in the enabled state.

The above gives only several examples that the electronic device is in the first state and the electronic device is in the second state. Actually, any low power state in which both the display unit and projection unit are in the disabled state is the first state; and any normal operation state in which at least the display unit is in the enabled state is the second state.

Firstly, trigger information for indicating the smart phone to switch from the first state to the second state is obtained. The trigger information may be an operation for long-pressing a power button of the smart phone for a predetermined period, an operation for pressing the power button of the smart phone, or an operation of turning on the screen backlight of the smart phone.

In the above, only several examples of the trigger information are provided. Actually, any trigger information capable of triggering the electronic device to switch from the first state to the second state falls within the scope of the present application.

Next, in response to the trigger information, the smart phone is controlled to switch from the first state to the second state. Specifically, in the case that the first state of the smart phone is the shut-down state, if the smart phone receives the trigger information that the power button of the smart phone is long-pressed for the predetermined period such as 10 seconds, the smart phone is switched from the shutdown state to a startup state. In the case that the first state of the smart phone is the lock screen state, if the smart phone receives the trigger information that the power button of the smart phone is pressed, the smart phone is switched from the lock screen state to a unlock screen state. In the case that the first state of the smart phone is the screen backlight turn-off state, if the smart phone receives the trigger information of an operation of turning on the screen backlight of the smart phone, the smart phone is switched from the screen backlight turn-off state to a screen backlight turn-on state.

In the above, some examples for switching the electronic device from the first state to the second state according to the trigger information are provided. Actually, for different first states, the electronic device can be triggered to switch from the first state to a different second state in response to different trigger information, which will not be limited herein.

After the step S20 is performed, at least the display unit of the electronic device is in the enabled state. Before the step S30 is performed, the information processing method according to the embodiment of the present application further includes step three, which includes acquiring a first operation for a predetermined icon on the second display interface.

After the above step three, steps 30 to 50 are performed:

The step S30 includes: obtaining at least one parameter information.

The step S40 includes: determining whether to enable the projection unit, based on the at least one parameter information.

The step S50 includes: controlling the projection unit to be in the enabled state, in a case that it is determined to enable the projection unit based on the at least one parameter information.

In the embodiment of the present application, the second display interface is a display interface displayed by the display unit of the electronic device. The predetermined icon may be a projection function switch icon, an application icon corresponding to an application, an application corresponding to a voice communication or a text communication, or an application icon corresponding to a common application.

In the embodiment of the present application, for the first operations applied to different predetermined icons on the second display interface, at least one parameter information configured to determine whether to enable the projection unit is also different. Specifically, there are multiple cases as follows.

In a first case, if the predetermined icon is the projection function switch icon, the at least one parameter information is a first switch signal for enabling the projection unit in response to the first operation for the projection function switch icon.

In a second case, if the predetermined icon is the application icon corresponding to the application, the at least one parameter information is a second switch signal for enabling the application in response to the first operation for the application icon.

When the application is run, an application display interface corresponding to the application can be divided into multiple display contents which are displayed in multiple display screens respectively.

In a third case, if the predetermined icon is the application icon corresponding to the voice communication or the text communication, the at least one parameter information is a preset communication content for enabling the projection unit, which exists in a content of the voice communication or the text communication.

In a fourth case, if the predetermined icon is the application icon corresponding to the common application and a prompt information including a first option for enabling the projection unit and a second option for disabling the projection unit is displayed on the second display interface, then the at least one parameter information indicates to obtain a second operation for the first option.

When the common application operates, the application display interface corresponding to the common application only can be displayed in the display screen as a whole, which cannot be divided into different display contents.

Specifically, in the first case, the step three and the steps S30 to S40 are implemented as follows.

After at least the display unit of the smart phone is in the enabled state, an operation applied to the projection function switch icon on the display interface displayed by the display unit is obtained, and then the first switch signal for enabling the projection unit is obtained in response to the operation applied to the projection function switch icon. Once the first switch signal is obtained, the projection unit is controlled to be in the enabled state.

Specifically, in the second case, the step three and the steps S30 to S40 are implemented as follows.

After at least the display unit of the smart phone is in the enabled state, an operation applied to the application icon corresponding to the application on the display interface displayed by the display unit is obtained, and then the second switch signal for enabling the application is obtained in response to the operation applied to the application icon corresponding to the application. Once the second switch signal is obtained, the projection unit is controlled to be in the enabled state. The application is also in the enabled state when the projection unit is enabled.

The application may be a double-screen application. When the double-screen application is run, an application display interface corresponding to the double-screen application may be displayed in multiple display screens. For example, a browsing portion of the application display interface may be displayed in a first display screen, and an operation portion of the application display interface may be displayed in a second display screen. That is, when the application display interface of the double-screen application is displayed or projected, a content of the double-screen display interface may be divided automatically based on a preset rule, hence different portions are displayed or projected on different display screens.

Specifically, in the third case, the step three and the steps S30 to S40 are implemented as follows.

After at least the display unit of the smart phone is in the enabled state, an operation of the application icon corresponding to the voice communication or the text communication on the display interface displayed by the display unit is obtained, and then the preset communication content for enabling the application is obtained in a content of the voice communication or the text communication. Once the preset communication content is obtained, the projection unit is controlled to be in the enabled state.

The application icon corresponding to the voice communication may be a calling icon, a voice messaging icon or a voice message recording icon. When the operation applied to the application icon corresponding to the voice communication is obtained, the electronic device may monitors in real time whether a preset communication content for enabling the projection unit exists in the content of the voice communication. For example, if the content of the voice communication is: I look for his contact number, then the preset communication content for enabling the projection unit, i.e. contact number, exists in the content of the voice communication. Thus, the projection unit is in the enabled state and projects an address list in the electronic device.

The application icon corresponding to the text communication may be a short message sending icon, a memo icon or a notebook icon. In the case that the operation for the application icon corresponding to the text communication content is obtained, the electronic device may monitors in real time whether a preset communication content for enabling the projection unit exists in the content of the text communication. For example, if the content of the text communication is: I send an address to you, then the preset communication content for enabling the projection unit: address, exists in the text communication content. Thus, the projection unit is in the enabled state and projects a map application in the electronic device.

Specifically, in the fourth case, the step three and the steps S30 to S40 are implemented as follows.

After at least the display unit of the smart phone is in the enabled state, an operation applied to the application icon corresponding to the common application on the display interface displayed by the display unit is obtained. When the prompt information including the first option for enabling the projection and the second option for disabling the projection unit is displayed on the display interface, a second operation for the first option is obtained. Once the second operation is obtained, the projection unit is controlled to be in the enabled state. The common application is also in the enabled state when the projection unit is enabled.

When the common application runs, an application display interface corresponding to the common application generally may be only displayed in one or more display screens as a whole. During the display or projection of the application display interface corresponding to the application, the application display interface can be only displayed or projected as a whole, which cannot be divided.

After the step S50 is performed, the projection unit is in the enabled state. The method according to the embodiment of the present application may perform the following step.

Step six includes: displaying a first display content on the first display interface and generating a first prompt information.

Or step seven includes: displaying the first display content on the second display interface and generating the first prompt information.

In the embodiment of the present application, the first display content may be a notification pushed by a system, or an application notification. The first prompt information may be a voice message, a vibration, and the like. In the above, only several examples of the first display content and the first prompt information are provided. In practice, any content which needs to be viewed by a user may be the first display content, and any prompting manner having a prompting effect may be the first prompt information, and the specific forms of the first display content and the first prompt information are not limited herein.

Specifically, in the case that it is determined to enable the projection unit according to the at least one parameter information, the projection unit is controlled to be in the enabled state. In this case, all contents to be displayed, such as the notification pushed by the system and the application notification, are displayed directly on the projection display interface, and an assistant prompt is provided to the user by the voice, vibration simultaneously.

In the case that it is not determined to enable the projection unit according to the at least one parameter information, the projection unit is maintained to be in the disabled state. In this case, the content to be displayed, such as the notification pushed by the system and the application notification, is displayed on the display interface of the mobile phone, and an assistant prompt is provided to the user by the voice, vibration simultaneously.

After the step six is performed, the information processing method according to the embodiment of the present application may perform the following steps.

Step eight includes: detecting a first touch operation for the first display interface, during a communication between the electronic device and a second electronic device.

Step nine includes: judging whether the first touch operation touches a first application icon on the first display interface, to obtain a first judgment result.

Step ten includes: running a first application corresponding to the first application icon, in a case that the first judgment result indicates that the first touch operation touches the first application icon.

Step eleven includes: judging whether the first touch operation touches a second region on the first display interface, to obtain a second judgment result, in a case that the first judgment result indicates that the first touch operation does not touch the first application icon.

Step twelve includes: displaying a second display content received from the second electronic device, in a case that the second judgment result indicates that the first touch operation touches the second region.

Step thirteen includes: judging whether the first touch operation touch a third region of the first display interface except the first application icon and the second region, to obtain a third judgment result; or judging whether a first touch trajectory of the first touch operation is a preset trajectory, to obtain a third judgment result.

Step fourteen includes: displaying a communication content between the electronic device and the second electronic device, in a case that the third judgment result indicates that the first touch operation touch the third region of the first display interface except the first application icon and the second region; or that the first touch trajectory of the first touch operation is the preset trajectory.

Figure 2:
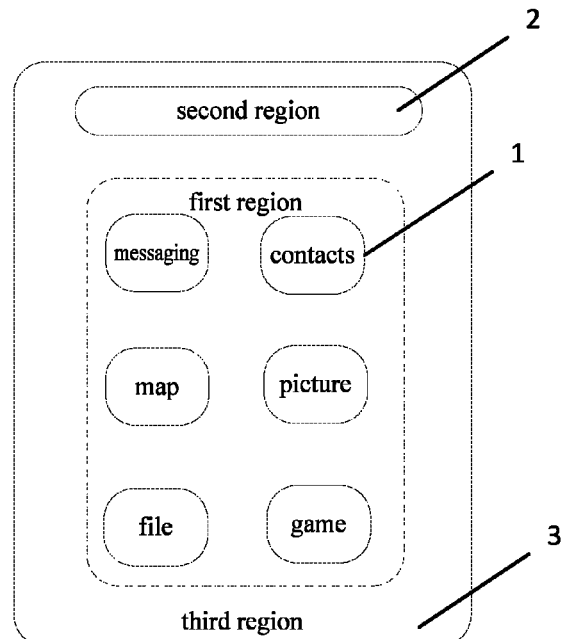
FIG. 2 is a schematic diagram of three regions of a first display interface according to the first embodiment of the application.

In the embodiment of the present application, during the communication between the electronic device and the second electronic device, the projection display interface projected by the projection unit of the electronic device may be divided into three regions. As shown in FIG. 2, a first region 1 is a touch region including at least one application icon. An application corresponding to the application icon is controlled to be in a running state when a touch operation applied to the at least one application icon is obtained. A second region 2 is a touch region with a certain area. When a touch operation for the second region is obtained, a content related to the second electronic device may be displayed on the projection display interface. A third region 3 is a touch region other than the first and second regions. When a touch operation for the third region is obtained or a touch trajectory on the third region is a preset trajectory, a communication content between the electronic device and the second electronic device may be displayed on the projection display interface.

Specifically, after the step six or seven, the projection unit of the electronic device is in the enabled state. In the following, implementations of the steps eight to thirteenth are described in detail by taking a case that the electronic device is a smart phone with the projection function and the second electronic device is a second smart phone with the projection function as an example.

In the case that the projection unit of the smart phone is in the enabled state and a voice communication is performed between the smart phone and the second smart phone, it is detected whether there is an operation for the projection display interface projected by the projection unit of the smart phone. If it is detected that there is the operation for the projection display interface, it is further determined whether the operation is applied to the first region, the second region or the third region. In the case that the operation is applied to the first region, a certain application icon in the first region is obtained, which is touched by the operation, and then an application corresponding to the application icon is run. In the case that the operation is applied to the second region, a content associated with the second smart phone may be displayed on the projection display interface. In the case that the operation is applied to the third region, the communication content between the smart phone and the second smart phone may be displayed on the projection display interface.

For example, in the case that the projection unit of the smart phone is in the enabled state and the voice communication is performed between the smart phone and the second smart phone, a map application is run, when a user 1 of the smart phone clicks a map icon in the first region of the projection display interface; a short message application is run, when the user 1 clicks a short message sending icon in the first region; a folder list is run, when the user 1 clicks a file transmission icon in the first region.

In the case that the projection unit of the smart phone is in the enabled state and the voice communication is performed between the smart phone and the second smart phone, when the user 1 of the smart phone clicks the second region of the projection display interface, a microlog posted by a user 2 of the second smart phone, a short message content and a mail content sent by the user 2 or sent to the user 2 may be displayed on the projection display interface.

In the case that the projection unit of the smart phone is in the enabled state and the voice communication is performed between the smart phone and the second smart phone, when the user 1 of the smart phone clicks the third region of the projection display interface or a touch trajectory on the third region is from top to bottom or from left to right, a message record and a mail record between the user 1 of the smart phone and the user 2 of the second smart phone may be displayed on the projection display interface.

Second Embodiment

Based on the same application concept, an electronic device is further provided according to the embodiments of the present application. Since the electronic device has a same principle for solving a problem as a processing information method, the implementation of the electronic device may refer to the implementation of the above information processing method, and a repeat portion will not be described hereinafter.

Figure 3:
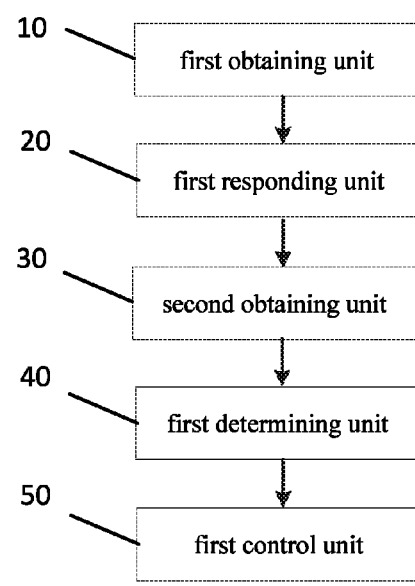
FIG. 3 is a block diagram of an electronic device according to a second embodiment of the application.

As shown in FIG. 3, an electronic device includes components as follows.

The electronic device includes a main body, a display unit and a projection unit. The display unit is arranged on a first surface of the main body, which has a first edge and a second edge facing the first edge. The first edge is parallel to the second edge. The projection unit is arranged in the main body, which is configured to project a content to be projected on a projection region. In the case that the projection region is arranged on a first carrying surface of a carrying body, a first display interface corresponding to the content to be projected is formed. The first display interface is located on a first side corresponding to the first edge of the display unit. The display unit is capable of displaying a second display interface. A predetermined angle is provided between the first and second display interfaces. The electronic device further includes: a first obtaining unit 10, a first responding unit 20, a second obtaining unit 30, a first determination unit 40 and a first control unit 50.

The first obtaining unit 10 is configured to obtain trigger information for instructing the electronic device to switch from a first state to a second state, where the first state is a low power state of the electronic device, and the second state is a normal operation state of the electronic device.

The first responding unit 20 is configured to control the electronic device to switch from the first state to the second state in response to the trigger information, where in a case that the electronic device is in the first state, the display unit is in a disabled state, and the projection unit is in the disabled state; and when the electronic device is in the second state, at least the display unit is in an enabled state.

The second obtaining unit 30 is configured to obtain at least one parameter information.

The first determination unit 40 is configured to determine whether to enable the projection unit, based on the at least one parameter information.

The first control unit 50 is configured to control the projection unit to be in the enabled state, in a case that it is determined to enable the projection unit based on the at least one parameter information.

Figure 4:
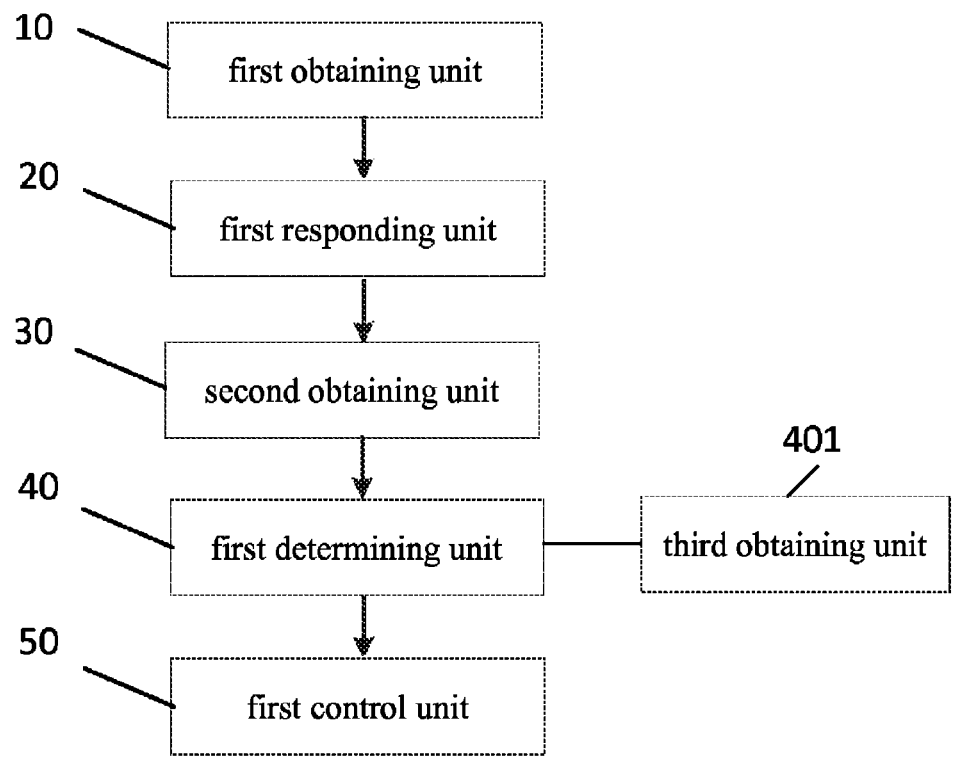
FIG. 4 is a block diagram of an electronic device according to the second embodiment of the application.

Referring to FIG. 4, in the embodiment of the present application, the electronic device may further include: a third obtaining unit 401.

The third obtaining unit 401 is configured to obtain a first operation for a predetermined icon on the second display interface.

Optionally, in a case that the predetermined icon is a projection function switch icon, the at least one parameter information includes: a first switch signal for enabling the projection unit in response to the first operation for the projection function switch icon.

Optionally, in a case that the predetermined icon is an application icon corresponding to an application, the at least one parameter information includes: a second switch signal for enabling the application in response to the first operation on the application icon.

When the application is run, an application display interface corresponding to the application is divided into multiple display contents, and the multiple display contents are displayed in different display screens.

Optionally, in a case that the predetermined icon is an application icon corresponding to a voice communication or a text communication, the at least one parameter information is a preset communication content for enabling the projection unit in a voice communication content or a text communication content.

Optionally, in a case that the predetermined icon is an application icon corresponding to a common application, and a prompt information is displayed on the second display interface, and the prompt information includes a first option for enabling the projection unit and a second option for disabling the projection unit, the at least one parameter information comprises a second operation for the first option.

When the common application is run, an application display interface corresponding to the common application is not divided into a plurality of display contents, which is integrally displayed in a display screen.

Figure 5:
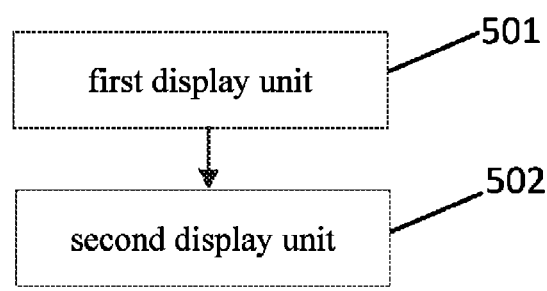
FIG. 5 is a block diagram of another electronic device according to the second embodiment of the application.

Referring to FIG. 5, in the embodiment of the present application, the electronic device further includes: a first display unit 501.

The first display unit 501 is configured to display a first display content on the first display interface and generate a first prompt information.

Optionally, the electronic device further includes: a second display unit 502.

The second display unit 502 is configured to display the first display content on the second display interface and generate the first prompt information.

Figure 6:
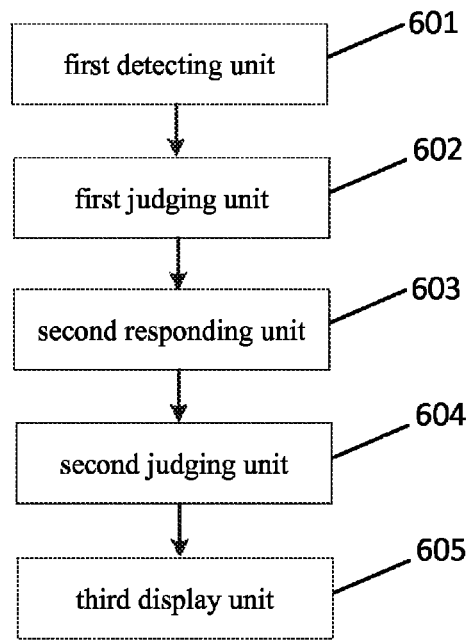
FIG. 6 is a block diagram of another electronic device according to the second embodiment of the application.

Referring to FIG. 6, in the embodiment of the present application, the electronic device further includes: a first detecting unit 601, a first judging unit 602, and a second responding unit 603.

The first detecting unit 601 is configured to detect a first touch operation for the first display interface, during a communication between the electronic device and a second electronic device.

The first judging unit 602 is configured to judge whether the first touch operation touches a first application icon on the first display interface, to obtain a first judgment result.

The second responding unit 603 is configured to run a first application corresponding to the first application icon, in a case that the first judgment result indicates that the first touch operation touches the first application icon.

Optionally, the electronic device further includes: a second judging unit 604 and a third display unit 605.

The second judging unit 604 is configured to judge whether the first touch operation touches a second region on the first display interface, to obtain a second judgment result, in a case that the first judgment result indicates that the first touch operation does not touch the first application icon.

The third display unit 605 is configured to display a second display content received from the second electronic device, in a case that the second judgment result indicates that the first touch operation touches the second region.

Figure 7:
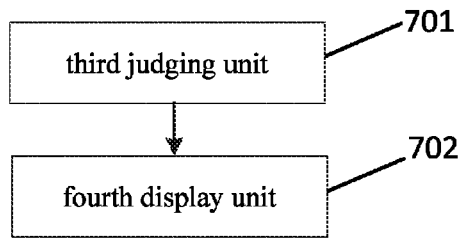
FIG. 7 is a block diagram of another electronic device according to the second embodiment of the application.

Referring to FIG. 7, in the embodiment of the present application, the electronic device further includes: a third judging unit 701 and a fourth display unit 702.

The third judging unit 701 is configured to judge whether the first touch operation touch a third region of the first display interface except the first application icon and the second region, to obtain a third judgment result; or judge whether a first touch trajectory of the first touch operation is a preset trajectory, to obtain a third judgment result.

The fourth display unit 702 is configured to display a communication content between the electronic device and the second electronic device, in a case that the third judgment result indicates that the first touch operation touch the third region of the first display interface except the first application icon and the second region; or that the first touch trajectory of the first touch operation is the preset trajectory.

Third Embodiment

Figure 8:
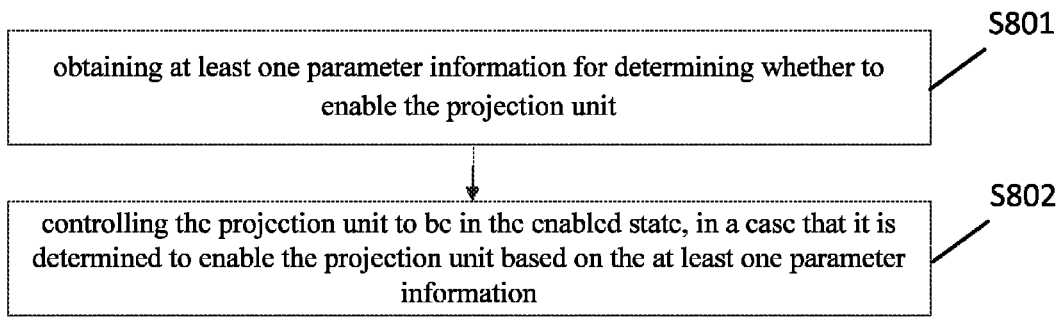
FIG. 8 is a flow chart of an information processing method according to a third embodiment of the application.

As shown in FIG. 8, another information processing method is further provided according to the embodiment of the present application, which is applied to an electronic device including a projection unit. The method includes: steps S801-S802.

The step S801 includes: obtaining at least one parameter information for determining whether to enable the projection unit.

The step S802 includes: controlling the projection unit to be in the enabled state, in a case that it is determined to enable the projection unit based on the at least one parameter information.

In the embodiment, the at least one parameter information may include: a first switch signal for enabling the projection unit in response to a first operation for a projection function switch icon.

Alternatively, the at least one parameter information may include: a second switch signal for enabling an application in response to a second operation for an application icon corresponding to the application, where an application display interface corresponding to the application is divided into multiple display contents which are displayed in different display screens respectively, when the application is run.

Alternatively, the at least one parameter information may include: a preset communication content for enabling the projection unit, which exists in a voice communication or a text communication content.

Alternatively, the at least one parameter information may indicate to obtain a third operation for the first option, in the case that a prompt information including a first option for enabling the projection unit and a second option for disabling the projection unit is displayed on the display screen of the electronic device.

Alternatively, the at least one parameter information may be operation information for representing that an operation applied to a physical button on the electronic device.

Specifically, the information processing method according to the embodiment of the present application is applied to an electronic device with a projection unit. The electronic device may be a smart phone with a projection function, a laptop with the projection function, or a tablet PC with the projection function. Actually, any electronic device with the projection function may realize the information processing method according to the embodiment of the present application, which will not be limited herein. The information processing method according to the embodiment of the present application is described only by taking the smart phone with the projection function as an example.

Firstly, the at least one parameter information is used for determining whether to enable the projection unit.

Specifically, the at least one parameter information may be information as follows.

A first type of the at least one parameter information is the first switch signal for enabling the projection unit in response to the first operation for the projection function switch icon. That is, the projection function switch icon is clicked and then the first switch signal for enabling the projection unit is sent.

A second type of the at least one parameter information is the second switch signal for enabling the application in response to the second operation for the application icon corresponding to the application. The application display interface corresponding to the application is divided into multiple display contents which are displayed in different display screens respectively, when the application is run. The application icon is clicked, and then the second switch signal for enabling the application is sent.

The application may be a double-screen application. When the double-screen application is run, an application display interface corresponding to the double-screen application may be displayed in multiple display screens. For example, a browsing portion of the application display interface may be displayed in a first display screen, and an operation portion of the application display interface may be displayed in a second display screen. That is, when the application display interface of the double-screen application is displayed or projected, a content of the double-screen display interface may be divided automatically based on a preset rule, hence different portions are displayed or projected on different display screens.

A third type of the at least one parameter information is the preset communication content for enabling the projection unit in a content of the voice communication or a text communication. The electronic device may monitors in real time whether a preset communication content for enabling the projection unit exists in the content of the voice communication. For example, if the content of the voice communication is: I look for his contact number, then the preset communication content for enabling the projection unit, i.e. contact number, exists in the content of the voice communication. Thus, the projection unit is in the enabled state and projects an address list in the electronic device.

Alternatively, the electronic device may monitors in real time whether a preset communication content for enabling the projection unit exists in the text communication content. For example, if the content of the text communication is: I send an address to you, then the preset communication content for enabling the projection unit, i.e. address, exists in the content of the text communication. Thus, the projection unit is in the enabled state and projects a map application in the electronic device.

A fourth type of the at least one parameter information indicates to obtain a third operation for the first option, in the case that the prompt information including the first option for enabling the projection unit and the second option for disabling the projection unit is displayed on the display screen of the electronic device.

That is, when the electronic device runs a common application, the prompting information including the first option for enabling the projection unit and the second option for disabling the projection unit may be displayed on the display screen of the electronic device. Then, the first option is clicked.

A fifth type of the at least one parameter information is operation information for representing that the operation is applied to the physical button on the electronic device. That is, the physical button configured to control to enable the projection unit is pressed.

Of course, only several examples of the at least one parameter information are provided in the above. In practice, any parameter information capable of triggering the projection unit to be in the enabled state falls within the scope of protection of the present application.

Next, in the case that the at least one parameter information is obtained in any of the above manners, the step S802 in the method according to the embodiment of the present application is performed, in which the projection unit is controlled to be in the enabled state when the at least one parameter information determines to enable the projection unit.

That is to say, when a projection function switch icon, an application icon or the first option for enabling the projection unit is clicked, the preset communication content is obtained; or when the physical button configured to control the projection unit to be enabled is pressed, the projection unit is controlled to be in the enabled state.

Based on the same application concept, another electronic device is further provided according to the embodiments of the present application. Since the electronic device has a same principle for solving a problem as a processing information method, the implementation of the electronic device may refer to the implementation of the above information processing method, and a repeat portion will not be described hereinafter.

Figure 9:
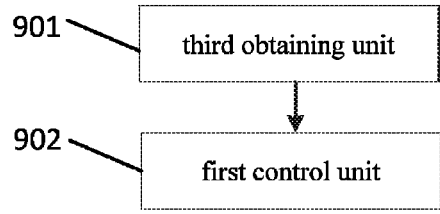
FIG. 9 is a block diagram of an electronic device according to a fourth embodiment of the application.

As shown in FIG. 9, an electronic device including a projection unit, and further includes: a third obtaining unit 901 and a first controlling unit 902.

The third obtaining unit 901 is configured to obtain at least one parameter information for determining whether to enable the projection unit.

The first controlling unit 902 is configured to control the projection to be in the enabled state, in the case that it is determined to enable the projection unit based on the at least one parameter information.

Optionally, the at least one parameter information is: a first switch signal for enabling the projection unit in response to a first operation for a projection function switch icon; or a second switch signal for enabling an application in response to a second operation for an application icon corresponding to the application, where an application display interface corresponding to the application is divided into multiple display contents which are displayed in different display screens respectively, when the application is run; or a preset communication content for enabling the projection unit in a content of a voice communication or a text communication; or obtaining a third operation for the first option, in the case that a prompt information including a first option for enabling the projection unit and a second option for disabling the projection unit is displayed on the display screen of the electronic device; or operation information for representing that an operation is applied to a physical button on the electronic device.

The technical schemes in the embodiments of the present application described above at least have technical effects or advantages as follows.

1. When at least the display unit of the electronic device is in the enabled state, at least one parameter information for determining whether to enable the projection unit of the electronic device is obtained. In the case that it is determined to enable the projection unit based on the at least one parameter information, the projection unit is controlled to be in the enabled state, where the parameter information can indicate whether to enable the projection unit of the electronic device when the electronic device is in different use cases. In this way, it is solved the technical problem of the electronic device in the existing technology that the projection unit can not be enabled flexibly enough. Thus, the projection unit can be enabled flexibly, and the user experience is improved.

2. When the display unit of the electronic device is in the enabled state, the operations for different predetermined icons on the display interface correspond to different parameter information for enabling the projection unit. Thus, the projection unit can be enabled in many operation ways.

3. By directly obtaining the at least one parameter information for enabling the projection unit, the projection unit can still be enabled in different ways even if the electronic device has no display unit or the display unit of the electronic device is in the disabled state. Thus, the projection unit can be enabled flexibly and the user experience is improved.

4. When the projection unit is in the enabled state, the first display content is displayed on the projection display interface; and when the projection unit is in the disabled state, the first display content is displayed on the display interface of the electronic device. In this way, the first display content can be displayed on different display interfaces based on the enabling condition of the projection unit. Thus, the user can still view the first display content when the projection unit is enabled and a new way for displaying information content is provided.

5. During a communication between the electronic device and the second electronic device, the projection display interface is divided into the first region, the second region and the third region. Different communication contents are displayed when the touch operations performs on the first region, the second region and the third region respectively. Therefore, a new way for interacting and checking the communication content is provided in the communication process.

Fifth Embodiment

The embodiment of the present application provides an information processing method applied to an electronic device. The electronic device includes a display unit and a projection unit, or includes a display unit and is connected to the projection unit, or is connected to the display unit and the projection unit. The electronic device has an operating system. After an application is installed on the electronic device based on the operating system, the method includes: displaying a display identification corresponding to the application on the display unit; obtaining an input operation for the display identification corresponding to the application, where the input operation is used to run the application; obtaining parameter information of the application; obtaining state information of the projection unit; and controlling the projection unit to display at least a first part of a graphic display interface corresponding to the application by calling a driving sub-unit of the projection unit when the application is run.

In the embodiment of the present application, when the application is run, the electronic device may acquire the parameter information of the application and the state information of the projection unit, so as to monitor the application and the display unit. Then, the display portion of the graphic display interface corresponding to the application in the projection unit is controlled by calling the driving sub-unit of the projection unit. Therefore, the operating system may control projection unit to display/project the graphic display interface. The driving sub-unit may control the projection unit to display the graphic display interface corresponding to the application in different display modes, in response to the different parameter information obtained by the electronic device and/or the different state information obtained by the electronic device. Thereby, the single display/projection mode of the application in the electronic device is improved, a flexibility of the display mode of the electronic device is improved and a display effect of the electronic device is enhanced.

Figure 10:
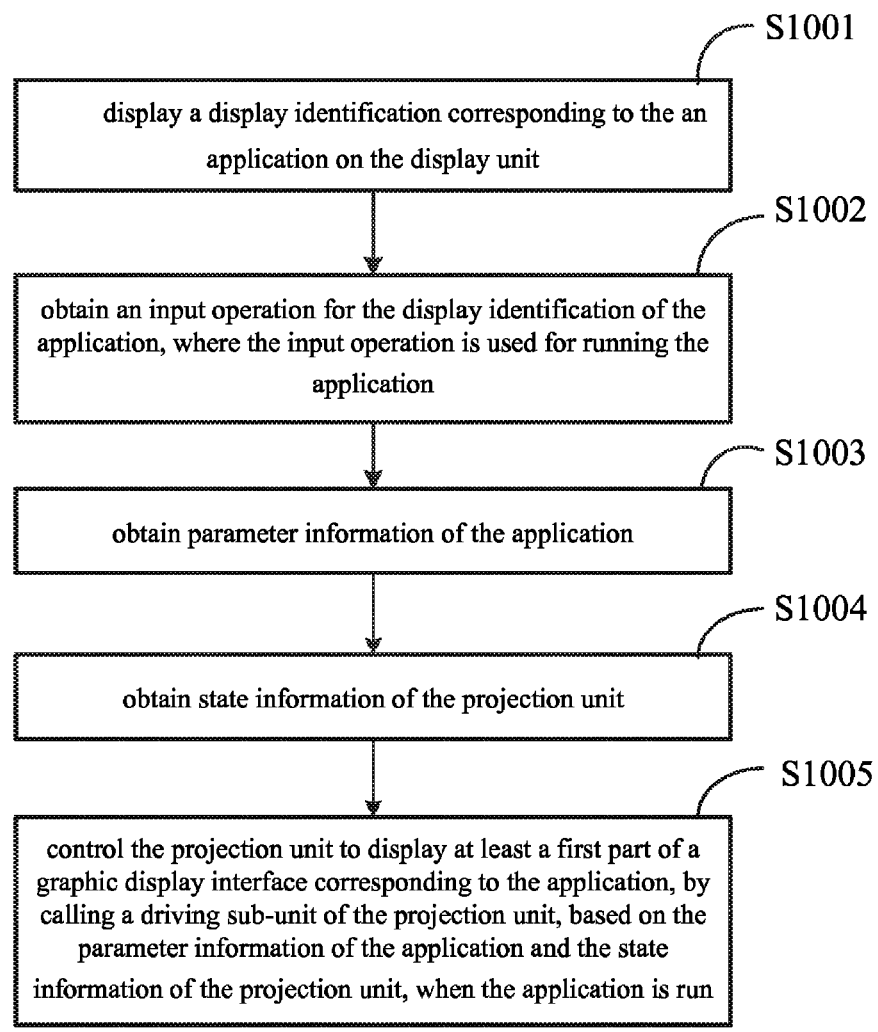
FIG. 10 is a flow chart of an information processing method according to a fifth embodiment of the application.

Referring to FIG. 10, the embodiment of the present application provides an information processing method applied to an electronic device. The electronic device includes a display unit and a projection unit, or includes the display unit and is connected to the projection unit, or is connected to the display unit and the projection unit. The electronic device has an operating system. After an application is installed on the electronic device based on the operating system, the method may include steps as follows.

Step S1001 may include: displaying a display identification corresponding to an application on the display unit.

In the embodiment of the present application, the application may be customized based on an application function thereof. For example, the application may be a double-screen application, a single-screen application, or an application of other types.

When the double-screen application is run, an application display interface corresponding to the double-screen application may be displayed in multiple display screens. For example, a browsing portion of the application display interface may be displayed in a first display screen; and an operation portion of the application display interface may be displayed in a second display screen. That is, when the application display interface corresponding to the double-screen application is displayed or projected, a content on the double-screen display interface may be divided automatically based on a preset rule, hence different portions are displayed or projected on different display screens.

When the single-screen application is run, an application display interface corresponding to the single-screen application may be integrally displayed in one or more display screens. The application display interface only can be displayed or projected as a whole, and cannot be divided, when the application display interface corresponding to the application is displayed or projected.

In the embodiment of the present application, the display unit may be a display unit arranged on the electronic device. For example, the display unit may be a touch display screen on the electronic device. Alternatively, the display unit may be a display device connected to the electronic device in a wired or wireless manner.

Preferably, in an embodiment of the present application, when the display identification corresponding to the application is displayed in the display unit, display identifications corresponding to other applications may also be displayed in the display unit.

In an embodiment of the present application, the display identification may be an operable identification such as an icon. The application may be started by operating the display identification.

Preferably, a projection carrying region of the projection unit may be perpendicular to the display unit.

Preferably, in the embodiment of the present application, if the display unit is arranged on the electronic device, the projection unit may also be arranged on the electronic device. Alternatively, the projection unit may be a projection apparatus or projection device connected to the electronic device via a projection interface, instead of being arranged on the electronic device.

Preferably, in an embodiment of the present application, in the case that the electronic device performs a project by using the projection unit, the projection carrying region of the projection unit may be a desktop, a wall or other carrying objects close to the electronic device. A projection content of the projection unit in the projection carrying region may be the same as or different from a display content of the display unit.

Step S1002 may include: obtaining an input operation for the display identification of the application, where the input operation is used for running the application.

In the embodiment of the present application, after the input operation is performed on the display identification in the display unit, the electronic device may respond to the input operation. For example, a program for running the application is called in response to the input operation.

For example, if the display identification is an icon, the input operation may be a touch operation or a click operation, which is performed by a user on the icon. Further, the click operation may be a single-click operation or a double-click operation, which will not be limited herein.

Step S1003 may include: obtaining parameter information of the application.

In the embodiment of the present application, after the input operation is obtained via the display unit, the electronic device may obtain the parameter information of the application, which may be information used for representing an application type of the application.

In the embodiment of the present application, the obtaining the parameter information of the application may further include: obtaining first parameter information for indicating that the type of the application is a first application type, in the case that the type of the application is the first application type, where the graphic display interface corresponding to a first application has a display content of the display unit and a display content of the projection unit; or obtaining second parameter information for indicating that a type of the application is a second application type, in the case that the type of the application is the second application type, where the graphic display interface corresponding to a second application has a display content of the display unit or a display content of the projection unit.

In the embodiment of the present application, the first application type may be a double-screen application type, that is, the application is a double-screen application. In the case that the type of the application is the first application type and the electronic device has the display unit and the projection unit, different parts of the graphic display interface corresponding to the application may be respectively displayed in the display unit and the projection unit, when the application is run. In this case, a display content in the display unit differs from a projection content in the projection unit.

For example, the application is a piano application, which is the double-screen application. When the piano application is run by the input operation, a piano score in a playing interface of the piano application may be displayed in the display unit, and piano keys in the playing interface of the piano application are displayed in the projection unit. In this case, when a user performs a playing gesture with hands in the projection unit, the electronic device may detect and recognize the playing gesture, and determines operated piano keys pressed by the operator based on the playing gesture. Then, the electronic device compares a score corresponding to the operated piano keys with the piano score in the display unit. For example, the electronic device may mark a part of the piano score which does not correspond to the operation piano key, that is, notes which are played incorrectly. Hence, the user may be prompted to correct them.

In an embodiment of the present application, the second application type may be the single-screen application. In the case that the type of the application is the second application type, the graphic display interface corresponding to the application may be integrally displayed in the display unit and/or the projection unit, when the application is run. If the graphic display interface corresponding to the application is displayed in both the display unit and the projection unit simultaneously, the display content in the display unit may be the same as that in the projection unit.

Step S1004 may include: obtaining state information of the projection unit.

In the embodiment of the present application, after the input operation is obtained, the electronic device may obtain the state information of the projection unit, besides the parameter information of the application. Thus, the electronic device may monitor the working state of the projection unit according to the state information. For example, the working state of the projection unit is in may be known by acquiring the state information, and then the projection unit may be further adjusted or processed based on the working state.

In the embodiment of the present application, the obtaining the state information of the projection unit may further include: obtaining state information for indicating that the projection unit is in a normal working state; or obtaining the state information for indicating that the projection unit is in a low power state.

Preferably, in the embodiment of the present application, a monitor program installed in the operating system in the electronic device may monitor the working state of the projection unit, which may send a prompt or alarm when the working state of the projection unit changes. For example, an indicator lamp may be arranged in the electronic device. When the projection unit is switched from the normal working state to the low power state, a shown color of the indicator lamp may be changed under the control.

Step S1005 may include: controlling the projection unit to display at least a first part of a graphic display interface corresponding to the application, by calling a driving sub-unit of the projection unit, based on the parameter information of the application and the state information of the projection unit, when the application is run.

In the embodiment of the present application, the driving sub-unit may be a hardware device in the electronic device, such as an input/output interface. Alternatively, the driving sub-unit may also be a software program, such as a driving program, for controlling the projection unit in the electronic device. The driving sub-unit may be called by the operating system in the electronic device to control the projection unit.

In an embodiment of the present application, the graphic display interface corresponding to the application may be an application interface corresponding to the application when the application is run by operating the display identification. The application interface may be an entire content displayed in the display unit and/or the projection unit when the application is run.

Preferably, in the embodiment of the present application, in the case that the type of the application is the first application type, the controlling the projection unit to display at least a first part of a graphic display interface corresponding to the application by calling a driving sub-unit of the projection unit, when the application is run, may further include: in the case that the projection unit is in the normal operation state, controlling the projection unit to display at least the first part of the graphic display interface corresponding to the application by calling the driving sub-unit of the projection unit, when the application is run; or in the case that the projection unit is in the low power state, controlling the projection unit to switch from the low power state to an enabled state by calling the driving sub-unit of the projection unit, when the application is run; and controlling the projection unit to display at least the first part of the graphic display interface corresponding to the application.

In the embodiment of the present application, in the case that the type of the application is the first application type and the projection unit is in the normal working state, the projection unit may be controlled to display at least the first part of the graphic display interface corresponding to the application, such as a key part of the piano application, by calling the driving sub-unit of the projection unit, when the application is run.

In the embodiment of the present application, in the case that the type of the application is the first application type and the projection unit is in the low power state, it is necessary to firstly call the driving sub-unit of the projection unit to control the projection unit to switch from the low power state into the enabled state, so that the projection unit is capable of performing the projection normally. Then, the projection unit is controlled to display at least the first part of the graphic display interface corresponding to the application.

Preferably, in the embodiment of the present application, in the case that the type of the application is the first application type, the application is run and the projection unit is controlled to display at least the first part of the graphic display interface corresponding to the application by calling the driving sub-unit of the projection unit. The electronic device may further control the display unit to display at least a second part of the graphic display interface corresponding to the application, such as the score part of the piano application. The order of the two steps may be arbitrary.

Preferably, in another embodiment of the present application, in the case that the type of the application is the second application type, the controlling the projection unit to display at least the first part of a graphic display interface corresponding to the application by calling the driving sub-unit of the projection unit, when the application is run may further include: controlling the electronic device to output determination information for determining a display mode of the application; and controlling the projection unit to display at least the first part of the graphic display interface corresponding to the application by calling the driving sub-unit of the projection unit, based on the display mode, when the application is run.

Preferably, in the embodiment of the present application, when the application is run, a user may select and determine the display mode of the application based on the determination information output by the electronic device. The electronic device may call the driving sub-unit of the projection unit to control the display content in the projection unit based on the display mode selected by the user.

In the embodiment of the present application, when the application is run, if it is determined that the type of the application is the first application type based on the acquired parameter information, that is, the application is the double-screen application, the application is further displayed and/or projected based on the state information of the projection unit. For example, when the projection unit is in the low power state, it is necessary to firstly control the projection unit to switch from the low power state into the enabled state by using the driving sub-unit of the projection unit, to ensure that a projection function of the projection unit can be used normally. That is, the electronic device may control the projection unit to be in the low power state in the case of no task, and control the projection unit to be in the enabled state rapidly by using the driving sub-unit if a projection needs to be performed. In this way, the electronic device can control the projection of the projection unit well. A user independent choice requirement is satisfied and the power consumption is reduced.

In the embodiment of the present application, in the case that the type of the application is the second application type and the projection unit is in the low power state, the controlling the electronic device to output determination information may include: controlling the electronic device to output prompt information for prompting whether to enable the projection unit; and obtaining prompt determining operation information for indicating to enable the projection unit, in response to the prompt information; and controlling the electronic device to output the determination information.

Preferably, in the embodiment of the present application, when the application is run and the projection unit is in the low power state, the electronic device is controlled to output the prompt information. If the user determines to enable the projection unit, the electronic device may control the projection unit to switch from the low power state to the enabled state, and then output the determination information for determining the display mode of the application, to determine the display mode of the application based on the determination information. If the user determines that the projection unit is not enabled, the electronic device may not control the projection unit to switch from the low power state into the enabled state, that is, the projection unit is not used. In this case, the graphic display interface corresponding to the application may be integrally displayed in the display unit.

In the embodiment of the present application, in the case that the type of the application is the second application type, that is, the application is the single-screen application, if it is determined that the projection unit is in the low power state, the user firstly needs to control the projection unit to switch from the low power state into the enabled state, and then chooses and determines the display mode of the projection unit, such as a mirrored display mode or an expanding display mode, based on the determination information output by the electronic device. Therefore, the display mode of the application is increased and the user experience is improved.

Preferably, in the embodiment of the present application, in the case that the type of the application is the second application type, the controlling the projection unit to display at least the first part of the graphic display interface corresponding to the application by calling the driving sub-unit of the projection unit, based on the display mode, when the application is run, may further include: controlling the projection unit to integrally display the graphic display interface corresponding to the application by calling the driving sub-unit of the projection unit, when the application is run, in the case that it is determined that the display mode of the application is a first display mode; or controlling the projection unit to display the first part of the graphic display interface corresponding to the application by calling the driving sub-unit of the projection unit, when the application is run, in the case that it is determined that the display mode of the application is a second display mode.

Preferably, in the embodiment of the present application, if it is determined that the display mode of the application is the first display mode and the projection unit is controlled to integrally display the graphic display interface corresponding to the application by calling the driving sub-unit of the projection unit, the electronic device may control the display unit to integrally display the graphic display interface corresponding to the application. For example, the application may be a lantern slide manuscript, which is the single-screen application. When a graphic display interface of the lantern slide manuscript is projected under the first display mode, a lantern slide content which is being played may be displayed in the display unit, which is the same as that displayed in the projection unit. That is, the lantern slide content in the display unit is projected into the projection unit to make it convenient for the user to viewing and communicating.

Preferably, in the embodiment of the present application, if it is determined that the display mode of the application is the second application type and the projection unit is controlled to display at least the first part of the graphic display interface corresponding to the application by calling the driving sub-unit of the projection unit, the electronic device may control the display unit to display the second part of the graphic display interface corresponding to the application. For example, the application may be the lantern slide manuscript, which is the single-screen application. When the graphic display interface of the lantern slide manuscript is projected under the second display mode, a lantern slide content which is being played may be displayed in the projection unit; and an identification function, a link content, and the like in the lantern slide content may be displayed in the display unit. Hence, it is convenient for the user to marking the lantern slide which is being played or performing a contrast explanation during a view or explanation.

Preferably, in the embodiment of the present application, the first display mode may be a mirrored display mode. That is, a display content of the display unit is the same as a projection content of the projection unit, in the case that the graphic display interface corresponding to the application is displayed in the first display mode.

Preferably, in the embodiment of the present application, the second display mode may be an expanding display mode, in which the application in the first application type is expanded and displayed. That is, the display content of the display unit is different from the projection content of the projection unit, in the case that the graphic display interface corresponding to the application is displayed in the second display mode.

For example, the application in the second application type is a dialing application, which is a single-screen application. When the user makes a call by using the dialing application, if it is determined that the display mode of the application is the first display mode, i.e. the mirrored display mode, the electronic device may control both the display unit and the second display interface to display an integral calling display interface of the dialing application. That is, the display content of the display unit is the same as the display content of the projection unit.

If it is determined that the display mode of the application is the second display mode, i.e. the expanding display mode, the electronic device may control the display unit to display a second part of the calling display interface corresponding to the dialing application, such as a calling state, a calling period of time, and the like; and also controls the projection unit to display a first part of the calling display interface by calling the driving sub-unit of the projection unit. For example, the projection unit may display a contact, a call record, a memo, and the like in the calling display interface corresponding to the dialing application. Preferably, the second display interface may be an identification interface for displaying a display identification of the dialing application. In addition, the display identifications corresponding to various applications in the identification interface may be operated.

Sixth Embodiment

Figure 11:
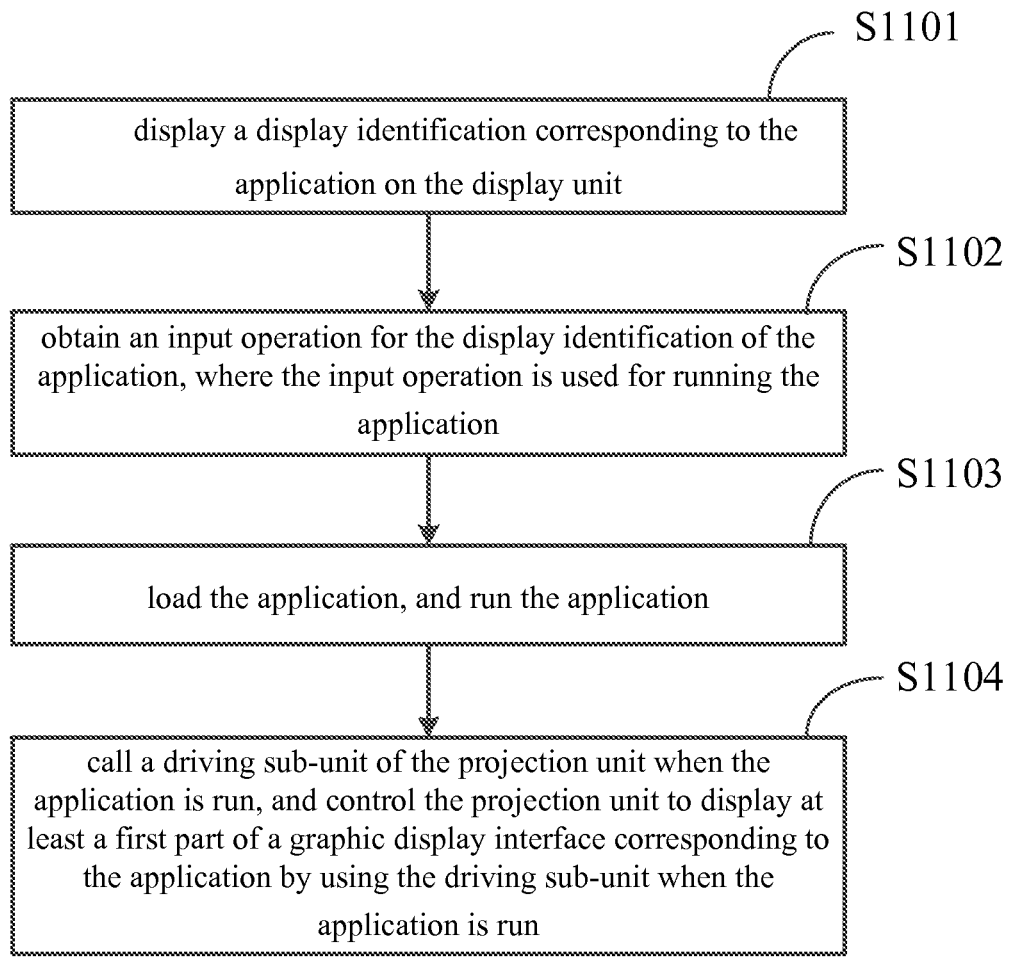
FIG. 11 is a flow chart of an information processing method according to a sixth embodiment of the application.

Referring to FIG. 11, the embodiment of the present application provides an information processing method applied to an electronic device. The electronic device includes a display unit and a projection unit; or the electronic device includes the display unit and is connected to the projection unit; or the electronic device is connected to the display unit and the projection unit. After an application is installed on the electronic device, the method may include steps as follows.

Step S1101 may include: displaying a display identification corresponding to the application on the display unit.

In the embodiment of the present application, the application may be customized based on an application function thereof. For example, the application may be a double-screen application or other customized applications which can be applied to a double-screen.

When the double-screen application is run, an application display interface corresponding to the double-screen application may be displayed in multiple display screens. For example, a browsing portion of the application display interface may be displayed in a first display screen; and an operation portion of the application display interface may be displayed in a second display screen. That is, when the application display interface corresponding to the double-screen application is displayed or projected, a content on the double-screen display interface may be divided automatically based on a preset rule, hence different portions are displayed or projected on different display screens.

In the embodiment of the present application, the display unit may be a display unit arranged on the electronic device.

For example, the display unit may be a touch display screen on the electronic device. Alternatively, the display unit may be a display device connected to the electronic device in a wired or wireless mode.

Preferably, in an embodiment of the present application, when the display identification corresponding to the application is displayed in the display unit, display identifications corresponding to other applications may be also displayed in the display unit. In an embodiment of the present application, the display identification is an operable identification, such as an icon. The application may be started by operating the display identification.

Preferably, a projection carrying region of the projection unit may be perpendicular to the display unit.

Preferably, in the embodiment of the present application, if the display unit is arranged on the electronic device, the projection unit may also be arranged on the electronic device. Alternatively, the projection unit may be a projection apparatus or projection device connected to the electronic device via a projection interface, instead of being arranged on the electronic device.

Preferably, in an embodiment of the present application, in the case that the electronic device performs a project by using the projection unit, the projection carrying region of the projection unit may be a desktop, a wall or other carrying objects close to the electronic device. A projection content of the projection unit in the projection carrying region may be the same as or different from a display content of the display unit.

Step S1102 may include: obtaining an input operation for the display identification of the application, where the input operation is used for running the application.

In the embodiment of the present application, after the input operation is performed on the display identification in the display unit, the electronic device may respond to the input operation. For example, a program for running the application is called in response to the input operation.

For example, if the display identification is an icon, the input operation may be a touch operation or a click operation, which is performed by a user on the icon. Further, the click operation may be a single-click operation or a double-click operation, which will not be limited herein.

Step 1103 may include: loading the application, and running the application.

In the embodiment of the present application, in the case that the electronic device obtains the input operation, the electronic device may load the application, i.e. the double-screen application, with an operating system in the electronic device, in response to the input operation; and then runs the application. The application has a corresponding application interface, and multiple parts of the application interface may be displayed/projected in different interfaces, so as to implement a particular corresponding function. For example, searching and positioning are performed on a displayed map interface; and a gesture is used to control a game role to move in a game interface.

Step S1104 may include: calling a driving sub-unit of the projection unit when the application is run, and controlling the projection unit to display at least a first part of a graphic display interface corresponding to the application by using the driving sub-unit when the application is run.

In the embodiment of the present application, the driving sub-unit may be a hardware device in the electronic device, such as an input/output interface. Alternatively, the driving sub-unit may also be a software program, such as a driving program, for controlling the projection unit in the electronic device. The driving sub-unit may be called by the operating system in the electronic device to control the projection unit.

In an embodiment of the present application, the graphic display interface of the application may be an application interface corresponding to the application when the application is run by operating the display identification. The application interface may be an entire content displayed in the display unit and projection unit when the application is run, and the display content in the display unit is different from the display content in the projection unit. For example, the application is a double-screen game application, such as a bowling game application. Once the electronic device runs the game application, contents corresponding to a bowling ball and a bowling alley in the bowling game may be considered as a first part of content, and a content of bowling pins is considered as a second part of content. Thereby, the bowling ball and the bowling alley may be displayed in the projection unit, and at least the second part of content, i.e., the bowling pins, may be displayed in the display unit. Therefore, different parts of the graphic display interface may be displayed respectively in the display unit and the projection unit.

Preferably, in the embodiment of the present application, when the application is run, the electronic device displays on the projection unit, by calling the driving sub-unit of the projection unit, at least the first part of the graphic display interface corresponding to the application when the application is run, and the electronic device may also display on the display unit the second part of the graphic display interface corresponding to the application when the application is run.

For example, the application is a piano application, which is the double-screen application. When the piano application is run by the input operation, the electronic device loads the application to run the application. Thereby, a piano score part in a playing interface of the piano application may be displayed in the display unit, and a piano key part in the playing interface of the piano application may be displayed in the projection unit by calling the driving sub-unit of the projection unit. In this case, when a user performs a playing gesture with hands in the projection unit, the electronic device may detect and recognize the playing gesture, and determines operated piano keys pressed by the operator based on the playing gesture. Then, the electronic device compares a score corresponding to the operated piano keys with the piano score in the display unit. For example, the electronic device may mark a part of the piano score which does not correspond to the operation piano key, that is, notes which are played incorrectly. Hence, the user may be prompted to correct them.

Preferably, in an embodiment of the present application, when the application is run, the electronic device may detect the working state of the projection unit. For example, if the projection unit is in the enabled state, the electronic device may display/project the application directly; and if the projection unit is in the disabled state, the projection unit may be controlled to switch from the disabled state into the enabled state by calling a driving module, so as to ensure that the projection unit may perform a display/projection normally.

In the embodiment of the present application, multiple parts of the graphic display interface corresponding to the application may be displayed or projected respectively in different display units. Hence, an interface range for the browse or operation in the graphic display interface is expanded; it is improved the technical issue that a display mode corresponding to an application is few and the display mode is not flexible in the existing technology. It is realized a technical effect that a practicability of the application in the electronic device is improved; and a user experience is improved.

Seventh Embodiment

Figure 12:
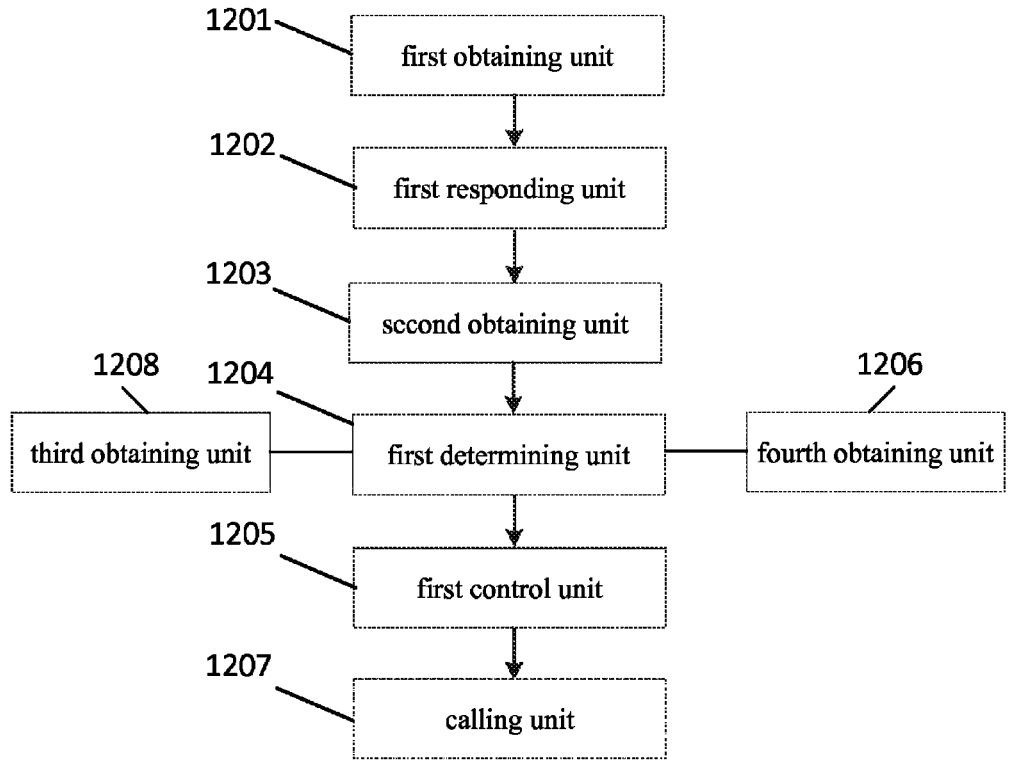
FIG. 12 is a block diagram of an electronic device according to a seventh embodiment of the application.

Referring to FIG. 12, the embodiment of the present application provides an electronic device which includes a display unit and a projection unit, or includes the display unit and is connected to the projection unit, or is connected to the display unit and connects the projection unit. The electronic device has an operating system. An application is installed in the electronic device based on the operating system. The electronic device may include: a first obtaining unit 1201, a first responding unit 1202, a second obtaining unit 1203, a first determining unit 1204, and a first control unit 1205.

The first obtaining unit 1201 is configured to obtain trigger information for instructing the electronic device to switch from a first state to a second state, where the first state is a low power state of the electronic device, and the second state is a normal operation state of the electronic device.

The first responding unit 1202 is configured to control the electronic device to switch from the first state to the second state in response to the trigger information, where in a case that the electronic device is in the first state, the display unit is in a disabled state, and the projection unit is in the disabled state; and when the electronic device is in the second state, at least the display unit is in an enabled state.

The second obtaining unit 1203 is configured to obtain at least one parameter information.

The first determining unit 1204 is configured to determine whether to enable the projection unit, based on the at least one parameter information.

The first control unit 1205 is configured to control the projection unit to be in the enabled state, in a case that it is determined to enable the projection unit based on the at least one parameter information.

The electronic device may further include: a third obtaining unit 1208 configured to obtain a first operation for a predetermined icon on the second display interface.

The first operation is an input operation for the predetermined icon, and the at least one parameter information is parameter information of an application corresponding to the predetermined icon.

The electronic device may further include: a fourth obtaining unit 1206, configured to obtain state information of the projection unit.

The first determining unit is further configured to determine whether to enable the projection unit, based on the at least one parameter information and the state information of the projection unit.

Optionally, the electronic device further includes a calling unit 1207, configured to control the projection unit to display at least a first part of a graphic display interface corresponding to the application by calling a driving sub-unit of the projection unit, when the application is run.

The calling unit 1207 is further configured to control the display unit to display at least a second part of the graphic display interface corresponding to the application, by calling a driving sub-unit of the projection unit; and The second obtaining unit 1203 is configured to:
obtain first parameter information for indicating that a type of the application is a first application type, in a case that the type of the application is the first application type, where the graphic display interface corresponding to the application includes a display content of the display unit and a display content of the projection unit; or obtain second parameter information for indicating that a type of the application is a second application type, in a case that a type of the application is a second application type, where the graphic display interface corresponding to the application includes a display content of the display unit or a display content of the projection unit, and the display content of the display unit is the same as the display content of the projection unit.

Optionally, the fourth obtaining unit 1206 is further configured to obtain state information for indicating that the projection unit is in a normal operation state, or obtain state information for indicating that the projection unit is in a low power state.

Optionally, in the case that the type of the application is the first application type, the calling unit 1207 is further configured to:

in the case that the projection unit is in the normal operation state, control the projection unit to display at least the first part of the graphic display interface corresponding to the application by calling the driving sub-unit of the projection unit, when the application is run; or in the case that the projection unit is in the low power state, control the projection unit to switch from the low power state to the enabled state by calling the driving sub-unit of the projection unit, when the application is run; and control the projection unit to display at least the first part of the graphic display interface corresponding to the application.

Optionally, in the case that the type of the application is the second application type, the calling unit 1207 is further configured to:

control the electronic device to output determination information for determining a display mode corresponding to the application; and control the projection unit to display at least the first part of the graphic display interface corresponding to the application by calling the driving sub-unit of the projection unit, based on the display mode, when the application is run.

Optionally, in the case that the type of the application is the second application type, the calling unit 1207 is further configured to:

when the projection unit is in the low power state, control the electronic device to output a prompt information for prompting whether to enable the projection unit; and obtain prompt determining operation information for indicating to enable the projection unit, in response to the prompt information; and control the electronic device to output the determination information.

Optionally, the calling unit 1207 is further configured to:

control the projection unit to integrally display the graphic display interface corresponding to the application by calling the driving sub-unit of the projection unit, when the application is run, in the case that it is determined that the display mode of the application is a first display mode; or control the projection unit to display the first part of the graphic display interface corresponding to the application by calling the driving sub-unit of the projection unit, when the application is run, in the case that it is determined that the display mode of the application is a second display mode.

Optionally, the calling unit 1207 is further configured to:

control the display unit to display integrally the graphic display interface corresponding to the application, in the case that it is determined that the display mode of the application is the first display mode; or control the display unit to display the second part of the graphic display interface corresponding to the application, in the case that it is determined that the display mode of the application is the second display mode.

Optionally, a projection carrying region of the projection unit is perpendicular to the display unit.

Eighth Embodiment

Figure 13:
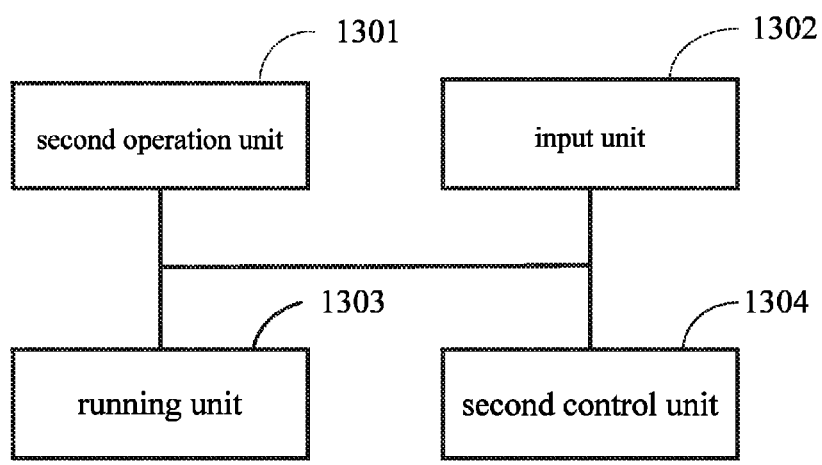
FIG. 13 is a block diagram of an electronic device according to an eighth embodiment of the application.

Referring to FIG. 13, the embodiment of the present application provides an electronic device, which includes a display unit and a projection unit, or includes the display unit and is connected to the projection unit, or is connected to the display unit and the projection unit. The electronic device has an operating system. An application is installed in the electronic device based on the operating system. The electronic device may include: a second operation unit 1301, an input unit 1302, a running unit 1303, and a second control unit 1304.

The second operation unit 1301 is configured to display a display identification corresponding to the application on a display unit.

The input unit 1302 is configured to obtain an input operation for the display identification corresponding to the application, where the input operation is used for running the application.

The running unit 1303 is configured to load the application to run the application.

The second control unit 1304 is configured to call a driving sub-unit of the projection unit when the application is run, and display at least a first part of a graphic display interface corresponding to the application when the application is run, on the projection unit via the driving sub-unit.

The second control unit 1304 is further configured to display on the display unit at least a second part of the graphic display interface corresponding to the application, when the application is run.

Preferably, in the embodiment of the present application, a projection carrying region of the projection unit is perpendicular to the display unit.

The embodiment of the present application provides an information processing method applied to an electronic device. The electronic device includes a display unit and a projection unit, or includes a display unit and is connected to a projection unit, or is connected to a display unit and a projection unit. the electronic device has an operating system, after an application is installed in the electronic device based on the operating system, the method includes: displaying a display identification corresponding to the application on the display unit; obtaining parameter information of the application; obtaining state information of the projection unit; and controlling the projection unit to display at least a first part of a graphic display interface corresponding to the application by calling a driving sub-unit of the projection unit, when the application is run.

In the embodiment of the present application, when the application is run, the electronic device may acquire the parameter information of the application and the state information of the projection unit, so as to monitor the application and the display unit. The display portion of the graphic display interface of the application in the projection unit is controlled by calling the driving sub-unit of the projection unit. Thus, the electronic device can control the display/projection of the graphic display interface of the application in the projection unit by using the operation system. When the electronic device obtains different parameter information and/or different state information, the driving sub-unit may control different display modes of the graphic display interface of the application in the projection unit. Therefore, the disadvantage of the relatively single display/projection way of the application in the electronic device is overcome, the flexibility of the display of the electronic device is improved, and the display effect of the electronic device is enhanced.

Those skilled in the art should understand that the embodiments of the present application may be provided as methods, systems or computer program products. Therefore, the application may be in a manner of a complete hardware embodiment, a complete software embodiment or an embodiment including software and hardware aspects. In addition, the present application may be in a manner of a computer program product implemented on one or more computer usable storage mediums (including but not limited to a magnetic disk memory, a CD-ROM, and a photo-optic memory) containing computer readable program codes.

The present application is described based on flowcharts and/or block diagrams of methods, devices (systems) and computer program products according to the embodiments of the present application. It should be understood that each flow and/or block in the flowcharts and/or block diagrams, and a combination of flows and/or blocks in the flowcharts and/or block diagrams may be implemented by computer program instructions. The computer program instructions may be provided to a general computer, a special-purpose computer, an embedded processor or a processor of other programmable data processing devices, to generate a machine. Thus, an apparatus for implementing a function specified in one or more flows in the flowchart or in one or more blocks in the block diagram is generated by executing the instructions with the computer or the processor of other programmable data processing devices.

The computer program instructions may be also stored in a computer readable storage capable of booting the computer or other programmable data processing devices to work in a particular manner, so that the instructions stored in the computer readable storage generates a manufacture including an instruction apparatus in which steps of a function specified in one or more flows of the flowcharts and/or one or more blocks of the block diagrams are implemented.

The computer program instructions may be also loaded on the computer or other programmable data processing devices, to enable a series of operation steps to be performed on the computer or other programmable data processing devices to generate a computer-implemented processing. Thereby, an instruction executed on the computer or other programmable devices provides steps for implementing functions specified in one or more flows of the flowcharts and/or one or more blocks of the block diagrams.

Specifically, the information processing method is applied to an electronic device including a main body, a display unit and a projection unit, where a first display interface corresponding to a content to be projected is formed on a projection region of the projection unit, and a second display interface can be displayed on the display unit. Computer program instructions corresponding to the information processing method may be stored on a storage medium such as an optical disk, a hard disk, a USB flash disk, or the like. In the case that the computer program instructions corresponding to the information processing method in the storage medium are read or executed by an electronic device, the method includes the following steps:

obtaining trigger information for instructing the electronic device to switch from a first state to a second state, where the first state is a low power state of the electronic device, and the second state is a normal operation state of the electronic device;

controlling the electronic device to switch from the first state to the second state in response to the trigger information, where in a case that the electronic device is in the first state, the display unit is in a disabled state, and the projection unit is in the disabled state; and in a case that the electronic device is in the second state, at least the display unit is in an enabled state;

obtaining at least one parameter information;

determining whether to enable the projection unit, based on the at least one parameter information; and controlling the projection unit to be in the enabled state, in a case that it is determined to enable the projection unit based on the at least one parameter information.

Optionally, before the obtaining at least one parameter information, the method stored in the storage medium further includes:

obtaining a first operation for a predetermined icon on the second display interface.

Optionally, in a case that the predetermined icon is a projection function switch icon, the at least one parameter information includes a first switch signal for enabling the projection unit in response to the first operation for the projection function switch icon.

Optionally, in a case that the predetermined icon is an application icon corresponding to an application, the at least one parameter information includes a second switch signal for enabling the application in response to the first operation for the application icon;

where when the application is run, an application display interface corresponding to the application is divided into a plurality of display contents and the plurality of display contents are displayed in different display screens.

Optionally, in a case that the predetermined icon is an application icon corresponding to a voice communication or a text communication, the at least one parameter information is a preset communication content for enabling the projection unit in a content of the voice communication or the text communication.

Optionally, in a case that the predetermined icon is an application icon corresponding to a common application, a prompt information is displayed on the second display interface, and the prompt information includes a first option for enabling the projection unit and a second option for disabling the projection unit, the at least one parameter information may include a second operation for the first option; and where when the common application is run, an application display interface corresponding to the common application is not divided into a plurality of display contents, and is integrally displayed in a display screen.

Optionally, after the controlling the projection unit to be in the enabled state, in a case that it is determined to enable the projection unit based on the at least one parameter information, the method stored in the storage medium further includes:

displaying a first display content on the first display interface and generating a first prompt information.

Optionally, in a case that it is not determined to enable the projection unit based on the at least one parameter information, the method further includes:

displaying the first display content on the second display interface and generating the first prompt information.

Optionally, after the controlling the projection unit to be in the enabled state, the method stored in the storage medium further includes:

detecting a first touch operation for the first display interface, during a communication between the electronic device and a second electronic device;

judging whether the first touch operation touches a first application icon on the first display interface, to obtain a first judgment result;

running a first application corresponding to the first application icon, in a case that the first judgment result indicates that the first touch operation touches the first application icon.

Optionally, after the judging whether the first touch operation touches a first application icon on the first display interface, to obtain a first judgment result, the method stored in the storage medium further includes:

judging whether the first touch operation touches a second region on the first display interface, to obtain a second judgment result, in a case that the first judgment result indicates that the first touch operation does not touch the first application icon; and displaying a second display content received from the second electronic device, in a case that the second judgment result indicates that the first touch operation touches the second region.

Optionally, after the judging whether the first touch operation touches a second region on the first display interface, to obtain a second judgment result, the method stored in the storage medium further includes:

judging whether the first touch operation touches a third region of the first display interface except the first application icon and the second region, to obtain a third judgment result, or judging whether a first touch trajectory of the first touch operation is a preset trajectory, to obtain a third judgment result; and displaying a communication content between the electronic device and the second electronic device, in a case that the third judgment result indicates that the first touch operation touches the third region of the first display interface except the first application icon and the second region; or that the first touch trajectory of the first touch operation is the preset trajectory.

Optionally, the first operation is an input operation for the predetermined icon, and the at least one parameter information is parameter information of an application corresponding to the predetermined icon.

Optionally, before the determining whether to enable the projection unit based on the at least one parameter information, the method further includes:

obtaining state information of the projection unit, and where the determining whether to enable the projection unit based on the at least one parameter information includes:

determining whether to enable the projection unit based on the at least one parameter information and the state information of the projection unit.

Optionally, after the controlling the projection unit to be in the enabled state, the method further includes:

controlling the projection unit to display at least a first part of a graphic display interface corresponding to the application by calling a driving sub-unit of the projection unit, when the application is run.

Optionally, the method further includes: controlling the display unit to display at least a second part of the graphic display interface corresponding to the application, by calling the riving sub-unit of the projection unit, and where the obtaining at least one parameter information includes:

obtaining first parameter information for indicating that a type of the application is a first application type in a case that the type of the application is the first application type, where the graphic display interface corresponding to the application includes a display content of the display unit and a display content of the projection unit; or obtaining second parameter information for indicating that a type of the application is a second application type in a case that the type of the application is the second application type, where the graphic display interface corresponding to the application includes a display content of the display unit or a display content of the projection unit, and the display content of the display unit is the same as the display content of the projection unit.

Optionally, the obtaining state information of the projection unit includes:

obtaining state information for indicating that the projection unit is in a normal operation state, or obtaining state information for indicating that the projection unit is in a low power state.

Optionally, in a case that the type of the application is the first application type, the controlling the projection unit to display at least a first part of a graphic display interface corresponding to the application by calling a driving sub-unit of the projection unit, when the application is run includes:

in a case that the type of the application is the first application type, the controlling the projection unit to display at least a first part of a graphic display interface corresponding to the application by calling a driving sub-unit of the projection unit, when the application is run includes:

in the case that the projection unit is in the normal operation state, controlling the projection unit to display at least the first part of the graphic display interface corresponding to the application by calling the driving sub-unit of the projection unit, when the application is run; or in the case that the projection unit is in the low power state, controlling the projection unit to switch from the low power state to the enabled state by calling the driving sub-unit of the projection unit, when the application is run; and controlling the projection unit to display at least the first part of the graphic display interface corresponding to the application, and in a case that the type of the application is the second application type, the controlling the projection unit to display at least a first part of a graphic display interface corresponding to the application by calling a driving sub-unit of the projection unit, when the application is run includes:

controlling the electronic device to output determination information for determining a display mode of the application; and controlling the projection unit to display at least the first part of the graphic display interface corresponding to the application by calling the driving sub-unit of the projection unit, based on the display mode, when the application is run.

Optionally, in the case that the projection unit is in the low power state, the controlling the electronic device to output determination information includes:

controlling the electronic device to output a prompt information for prompting whether to enable the projection unit; and obtaining a prompt determining operation information for indicating to enable the projection unit, in response to the prompt information; and controlling the electronic device to output the determination information.

Optionally, the controlling the projection unit to display at least the first part of the graphic display interface corresponding to the application by calling the driving sub-unit of the projection unit, based on the display mode, when the application is run includes:

controlling the projection unit to integrally display the graphic display interface corresponding to the application by calling the driving sub-unit of the projection unit, when the application is run, in the case that it is determined that the display mode of the application is a first display mode; or controlling the projection unit to display the first part of the graphic display interface corresponding to the application by calling the driving sub-unit of the projection unit, when the application is run, in the case that it is determined that the display mode of the application is a second display mode.

Optionally, the method further includes:

controlling the display unit to integrally display the graphic display interface corresponding to the application, in the case that it is determined that the display mode of the application is the first display mode; or controlling the display unit to display the second part of the graphic display interface corresponding to the application, in the case that it is determined that the display mode of the application is the second display mode.

Specifically, the information processing method in the embodiment of the application is applied to an electronic device, which includes a projection unit. The computer program instructions corresponding to the information processing method are stored in a storage medium such as an optical disk, hard disk, or U disk. When the computer program instructions corresponding to the information processing method which are stored in the storage medium are read or run by an electronic device, the following steps are performed:

obtaining at least one parameter information for determining whether to enable the projection unit; and controlling the projection unit to be in an enabled state, in a case that it is determined to enable the projection unit based on the at least one parameter information.

Optionally, the at least one parameter information is a first switch signal for enabling the projection unit in response to the first operation for the projection function switch icon; or a second switch signal for enabling an application with respect to the second operation on the application icon corresponding to the application, where when the application is run, an application display interface corresponding to the application is divided into multiple display contents which are displayed in different display screens respectively; or the at least one parameter information is a preset communication content for enabling the projection unit in a content of the voice communication or the text communication; or if a prompt information including a first option for enabling the projection unit and a second option for disabling the projection unit is displayed on the second display interface, the at least one parameter information includes a third operation for the first option; or the at least one parameter information is an operation information for indicating that an operation applied to a physical button on the electronic devices.

Although the preferred embodiments of the application have been described, upon knowing the basic creative conception, other variations and modifications can be made to these embodiments by those skilled in the art. Thus, the appended claims should be intercepted as including the preferred embodiments and all the variations and modifications falling within the scope of the application.

Apparently, various modifications and variations can be made to the application by those skilled in the art without deviating from the spirit and scope of the application. Then, if these modifications and variations fall within the scope of the claims of the application and the equivalents, the application is intended to include these modifications and variations.

The invention claimed is:

1. An information processing method, applied to an electronic device comprising a main body, a display unit and a projection unit, wherein a first display interface corresponding to a content to be projected is formed on a projection region of the projection unit, and a second display interface is displayed on the display unit, and wherein the method comprises:

obtaining trigger information for instructing the electronic device to switch from a first state to a second state, wherein the first state is a low power state of the electronic device, and the second state is a normal operation state of the electronic device;

controlling the electronic device to switch from the first state to the second state in response to the trigger information, wherein in a case that the electronic device is in the first state, the display unit is in a disabled state and the projection unit is in the disabled state; and when the electronic device is switched into the second state, the display unit is switched into an enabled state;

obtaining a first operation for a predetermined icon on the second display interface to run an application corresponding to an application icon;

obtaining at least one parameter information;

determining whether to enable the projection unit, based on the at least one parameter information; and controlling the projection unit to be in the enabled state, in a case that it is determined to enable the projection unit based on the at least one parameter information, wherein the predetermined icon is an application icon; and wherein in a case that the predetermined icon is an application icon corresponding to a voice communication or a text communication, the obtaining at least one parameter information comprises: obtaining a preset communication content as the at least one parameter information from a content of the voice communication or the text communication, and wherein after controlling the projection unit to be in the enabled state, the information processing method further comprise:

obtaining a first content from the voice communication or a text communication;

determining an application corresponding to the first content; and displaying an application display interface of the application corresponding to the first content as the first display interface.

2. The method according to claim 1, wherein in a case that the predetermined icon is a projection function switch icon, the at least one parameter information includes: a first switch signal for enabling the projection unit in response to the first operation for the projection function switch icon.

3. The method according to claim 1, wherein in a case that the predetermined icon is an application icon corresponding to an application, the at least one parameter information includes: a second switch signal for enabling the application in response to the first operation for the application icon, wherein when the application corresponding to the application icon is run, an application display interface corresponding to the application is divided into a plurality of display contents and a part of the plurality of display contents is displayed on the projection region of the projection unit as the first display interface, and another part of the plurality of display contents is displayed on the display unit as the second display interface, and wherein the first display interface is different from the second display interface.

4. The method according to claim 1, wherein the obtaining a first operation for a predetermined icon on the second display interface to run an application corresponding to the application icon comprises:

determining whether the first operation is applied to the predetermined icon or an application icon corresponding to a common application;

in a case that the first operation is applied to the application icon corresponding to the common application, a prompt information is displayed on the second display interface, and the prompt information comprises a first option for enabling the projection unit and a second option for disabling the projection unit, and wherein the obtaining at least one parameter information comprises: obtaining a second operation for the first option; and wherein when the common application is run, an application display interface corresponding to the common application is not divided into a plurality of display contents, and is integrally displayed in a display screen.

5. The method according to claim 1, wherein after the controlling the projection unit to be in the enabled state, in a case that it is determined to enable the projection unit based on the at least one parameter information, the method further comprises:

displaying a first display content on the first display interface and generating a first prompt information, and wherein in a case that it is not determined to enable the projection unit based on the at least one parameter information, the method further comprises:

displaying the first display content on the second display interface and generating the first prompt information.

6. The method according to claim 5, wherein after the controlling the projection unit to be in the enabled state, the method further comprises:

detecting a first touch operation for the first display interface, during a communication between the electronic device and a second electronic device;

judging whether the first touch operation touches a first application icon on the first display interface, to obtain a first judgment result;

running a first application corresponding to the first application icon, in a case that the first judgment result indicates that the first touch operation touches the first application icon;

judging whether the first touch operation touches a second region on the first display interface, to obtain a second judgment result, in a case that the first judgment result indicates that the first touch operation does not touch the first application icon; and displaying a second display content received from the second electronic device, in a case that the second judgment result indicates that the first touch operation touches the second region.

7. The method according to claim 6, wherein after the judging whether the first touch operation touches a second region on the first display interface, to obtain a second judgment result, the method further comprises:
judging whether the first touch operation touch a third region of the first display interface except the first application icon and the second region, to obtain a third judgment result; or judging whether a first touch trajectory of the first touch operation is a preset trajectory, to obtain a third judgment result; and
displaying a communication content between the electronic device and the second electronic device, in a case that the third judgment result indicates that the first touch operation touches the third region of the first display interface except the first application icon and the second region; or that the first touch trajectory of the first touch operation is the preset trajectory.

8. The method according to claim 1, wherein the first operation is an input operation for the predetermined icon, and the at least one parameter information is parameter information of an application corresponding to the predetermined icon;
wherein before the determining whether to enable the projection unit based on the at least one parameter information, the method further comprises: obtaining state information of the projection unit,
wherein the determining whether to enable the projection unit based on the at least one parameter information comprises: determining whether to enable the projection unit, based on the at least one parameter information and the state information of the projection unit; and
wherein after the controlling the projection unit to be in the enabled state, the method further comprises: controlling the projection unit to display at least a first part of a graphic display interface corresponding to the application by calling a driving sub-unit of the projection unit, when the application is run.

9. The method according to claim 8, further comprising:
controlling the display unit to display at least a second part of the graphic display interface corresponding to the application, by calling the driving sub-unit of the projection unit,
wherein the obtaining at least one parameter information comprises:
obtaining first parameter information for indicating that a type of the application is a first application type, in a case that the type of the application is the first application type, wherein the graphic display interface corresponding to the application comprises a display content of the display unit and a display content of the projection unit; or
obtaining second parameter information for indicating that a type of the application is a second application type, in a case that the type of the application is the second application type, wherein the graphic display interface corresponding to the application comprises a display content of the display unit or a display content of the projection unit, and the display content of the display unit is the same as the display content of the projection unit; and
wherein the obtaining state information of the projection unit comprises: obtaining state information for indicating that the projection unit is in a normal operation state, or obtaining state information for indicating that the projection unit is in a low power state.

10. The method according to claim 9, wherein
in the case that the type of the application is the first application type, the controlling the projection unit to display at least a first part of a graphic display interface corresponding to the application by calling a driving sub-unit of the projection unit, when the application is run comprises:
in the case that the projection unit is in the normal operation state, controlling the projection unit to display at least the first part of the graphic display interface corresponding to the application by calling the driving sub-unit of the projection unit, when the application is run; or
in the case that the projection unit is in the low power state, controlling the projection unit to switch from the low power state to the enabled state by calling the driving sub-unit of the projection unit, when the application is run; and controlling the projection unit to display at least the first part of the graphic display interface corresponding to the application, and
in the case that the type of the application is the second application type, the controlling the projection unit to display at least a first part of a graphic display interface corresponding to the application by calling the driving sub-unit of the projection unit, when the application is run comprises:
controlling the electronic device to output determination information for determining a display mode of the application; and
controlling the projection unit to display at least the first part of the graphic display interface corresponding to the application by calling the driving sub-unit of the projection unit, based on the display mode, when the application is run.

11. The method according to claim 10, wherein in the case that the projection unit is in the low power state, the controlling the electronic device to output determination information comprises:
controlling the electronic device to output prompt information for prompting whether to enable the projection unit; and
obtaining prompt determining operation information for indicating to enable the projection unit, in response to the prompt information; and controlling the electronic device to output the determination information.

12. The method according to claim 11, wherein the controlling the projection unit to display at least the first part of the graphic display interface corresponding to the application by calling the driving sub-unit of the projection unit, based on the display mode, when the application is run comprises:
controlling the projection unit to integrally display the graphic display interface corresponding to the application by calling the driving sub-unit of the projection unit, when the application is run, in the case that it is determined that the display mode of the application is a first display mode; or
controlling the projection unit to display the first part of the graphic display interface corresponding to the application by calling the driving sub-unit of the projection unit, when the application is run, in the case that it is determined that the display mode of the application is a second display mode.

13. The method according to claim 12, further comprising:

controlling the display unit to integrally display the graphic display interface corresponding to the application, in the case that it is determined that the display mode of the application is the first display mode; or controlling the display unit to display the second part of the graphic display interface corresponding to the application, in the case that it is determined that the display mode of the application is the second display mode.

14. An electronic device, comprising a main body, a display unit and a projection unit, wherein a first display interface corresponding to a content to be projected is formed on a projection region of the projection unit, and a second display interface is displayed on the display unit, and wherein the electronic device further comprises a processor and a memory for storing instructions executed by the processor to:

obtain trigger information for instructing the electronic device to switch from a first state to a second state, wherein the first state is a low power state of the electronic device, and the second state is a normal operation state of the electronic device;

control the electronic device to switch from the first state to the second state in response to the trigger information, wherein in a case that the electronic device is in the first state, the display unit is in a disabled state, and the projection unit is in the disabled state; and when the electronic device is switched into the second state, the display unit is switched into an enabled state;

obtain a first operation for a predetermined icon on the second display interface to run an application corresponding to an application icon;

obtain at least one parameter information;

determine whether to enable the projection unit, based on the at least one parameter information; and control the projection unit to be in the enabled state, in a case that it is determined to enable the projection unit based on the at least one parameter information, wherein the predetermined icon is an application icon; and wherein in a case that the predetermined icon is an application icon corresponding to a voice communication or a text communication, the obtaining at least one parameter information comprises: obtaining a preset communication content as the at least one parameter information from a content of the voice communication or the text communication, and wherein after controlling the projection unit to be in the enabled state, the instructions are executed by the processor to:

obtain a first content from the voice communication or a text communication;

determine an application corresponding to the first content; and display an application display interface of the application corresponding to the first content as the first display interface.

15. The electronic device according to claim 14, wherein in a case that the predetermined icon is a projection function switch icon, the at least one parameter information includes: a first switch signal for enabling the projection unit in response to the first operation for the projection function switch icon.

16. The electronic device according to claim 14, wherein in a case that the predetermined icon is an application icon corresponding to an application, the at least one parameter information includes: a second switch signal for enabling the application in response to the first operation on the application icon, and when the application corresponding to the application icon is run, an application display interface corresponding to the application is divided into a plurality of display contents and a part of the plurality of display contents is displayed on the projection region of the projection unit as the first display interface, and another part of the plurality of display contents is displayed on the display unit as the second display interface, and wherein the first display interface is different from the second display interface.

17. The electronic device according to claim 14, wherein the processor executes the instructions to:

determine whether the first operation is applied to the predetermined icon or an application icon corresponding to a common application; in a case that the first operation is applied to the application icon corresponding to the common application, a prompt information is displayed on the second display interface, and the prompt information comprises a first option for enabling the projection unit and a second option for disabling the projection unit;

the at least one parameter information comprises a second operation for the first option; and wherein when the common application is run, an application display interface corresponding to the common application is not divided into a plurality of display contents, and is integrally displayed in a display screen.

18. The electronic device according to claim 14, wherein the processor executes the instructions to:

display a first display content on the first display interface and generate a first prompt information, and display the first display content on the second display interface and generate the first prompt information.

19. The electronic device according to claim 18, wherein the processor executes the instructions to:

detect a first touch operation for the first display interface, during a communication between the electronic device and a second electronic device;

judge whether the first touch operation touches a first application icon on the first display interface, to obtain a first judgment result;

run a first application corresponding to the first application icon, in a case that the first judgment result indicates that the first touch operation touches the first application icon;

judge whether the first touch operation touches a second region on the first display interface, to obtain a second judgment result, in a case that the first judgment result indicates that the first touch operation does not touch the first application icon; and display a second display content received from the second electronic device, in a case that the second judgment result indicates that the first touch operation touches the second region.

20. The electronic device according to claim 19, wherein the processor executes the instructions to:

judge whether the first touch operation touch a third region of the first display interface except the first application icon and the second region, to obtain a third judgment result; or judge whether a first touch trajectory of the first touch operation is a preset trajectory, to obtain a third judgment result; and display a communication content between the electronic device and the second electronic device, in a case that the third judgment result indicates that the first touch operation touch the third region of the first display interface except the first application icon and the second region; or that the first touch trajectory of the first touch operation is the preset trajectory.

21. The electronic device according to claim 14, wherein the first operation is an input operation for the predetermined icon, and the at least one parameter information is parameter information of an application corresponding to the predetermined icon,
wherein the processor executes the instructions to:
obtain state information of the projection unit; and control the projection unit to display at least a first part of a graphic display interface corresponding to the application by calling a driving sub-unit of the projection unit, when the application is run, and
determine whether to enable the projection unit, based on the at least one parameter information and the state information of the projection unit.

22. The electronic device according to claim 21, wherein the processor executes the instructions to:
control the display unit to display at least a second part of the graphic display interface corresponding to the application, by calling a driving sub-unit of the projection unit, and
obtain first parameter information for indicating that a type of the application is a first application type, in a case that the type of the application is the first application type, wherein the graphic display interface corresponding to the application comprises a display content of the display unit and a display content of the projection unit; or
obtain second parameter information for indicating that a type of the application is a second application type, in a case that a type of the application is a second application type, wherein the graphic display interface corresponding to the application comprises a display content of the display unit or a display content of the projection unit, and the display content of the display unit is the same as the display content of the projection unit; and
wherein the processor executes the instructions to obtain state information for indicating that the projection unit is in a normal operation state, or obtain state information for indicating that the projection unit is in a low power state.

23. The electronic device according to claim 22, wherein:
in the case that the type of the application is the first application type, the processor executes the instructions to:
in the case that the projection unit is in the normal operation state, control the projection unit to display at least the first part of the graphic display interface corresponding to the application by calling the driving sub-unit of the projection unit, when the application is run; or
in the case that the projection unit is in the low power state, control the projection unit to switch from the low power state to the enabled state by calling the driving sub-unit of the projection unit, when the application is run; and control the projection unit to display at least the first part of the graphic display interface corresponding to the application; and
in the case that the type of the application is the second application type, the processor executes the instructions to:
control the electronic device to output determination information for determining a display mode of the application; and
control the projection unit to display at least the first part of the graphic display interface corresponding to the application by calling the driving sub-unit of the projection unit, based on the display mode, when the application is run.

24. The electronic device according to claim 23, wherein in the case that the type of the application is the second application type, the processor executes the instructions to:
when the projection unit is in the low power state, control the electronic device to output a prompt information for prompting whether to enable the projection unit; and
obtain prompt determining operation information for indicating to enable the projection unit, in response to the prompt information; and control the electronic device to output the determination information.

25. The electronic device according to claim 24, wherein the processor executes the instructions to:
control the projection unit to integrally display the graphic display interface corresponding to the application by calling the driving sub-unit of the projection unit, when the application is run, in the case that it is determined that the display mode of the application is a first display mode; or
control the projection unit to display the first part of the graphic display interface corresponding to the application by calling the driving sub-unit of the projection unit, when the application is run, in the case that it is determined that the display mode of the application is a second display mode.

26. The electronic device according to claim 25, wherein the processor executes the instructions to:
control the display unit to display integrally the graphic display interface corresponding to the application, in the case that it is determined that the display mode of the application is the first display mode; or
control the display unit to display the second part of the graphic display interface corresponding to the application, in the case that it is determined that the display mode of the application is the second display mode.

* * * * *